US011988549B2

(12) United States Patent
Koulomzin

(10) Patent No.: US 11,988,549 B2
(45) Date of Patent: May 21, 2024

(54) APPARATUS, METHODOLOGIES AND SOFTWARE APPLICATIONS FOR DETERMINING A LEVEL OF DIRECT SUNLIGHT

(71) Applicant: George Koulomzin, Bridgehampton, NY (US)

(72) Inventor: George Koulomzin, Bridgehampton, NY (US)

(73) Assignee: HOOK MOUNTAIN SOFTWARE DEVELOMENT, INC.

( * ) Notice: Subject to any disclaimer, the term of this patent is extended or adjusted under 35 U.S.C. 154(b) by 703 days.

(21) Appl. No.: 16/574,846

(22) Filed: Sep. 18, 2019

(65) Prior Publication Data

US 2020/0096387 A1   Mar. 26, 2020

Related U.S. Application Data

(60) Provisional application No. 62/733,916, filed on Sep. 20, 2018.

(51) Int. Cl.
| | |
|---|---|
| *G01J 1/02* | (2006.01) |
| *G01J 1/42* | (2006.01) |
| *G01S 3/786* | (2006.01) |
| *G01W 1/10* | (2006.01) |
| *G01W 1/12* | (2006.01) |

(52) U.S. Cl.
CPC .......... *G01J 1/0242* (2013.01); *G01J 1/4228* (2013.01); *G01S 3/7868* (2013.01); *G01W 1/10* (2013.01); *G01W 1/12* (2013.01); *G01J 2001/4285* (2013.01)

(58) Field of Classification Search
CPC ................... G01J 1/0242; G01J 1/4228; G01J 2001/4285; G01J 1/0466; G01J 2001/4266; G01J 2001/4276; G01S 3/7868; G01W 1/10; G01W 1/12; Y02E 10/50

See application file for complete search history.

(56) References Cited

U.S. PATENT DOCUMENTS 11,151,222 B1 * 10/2021 Coffey ................... G16H 20/70
2020/0374645 A1 * 11/2020 Settel ........................ G06F 3/16

FOREIGN PATENT DOCUMENTS

| JP | 5833267 B1 * | 12/2015 | |
|---|---|---|---|
| JP | 2016123170 A * | 7/2016 | |
| JP | 2018207669 A * | 12/2018 | |
| KR | 102092860 B1 * | 3/2020 | |
| WO | WO-2017193172 A1 * | 11/2017 | ............ G01J 1/0228 |
| WO | WO-2019021438 A1 * | 1/2019 | ............. G01W 1/10 |

OTHER PUBLICATIONS

WO-2019021438-A1 (Year: 2019).*
WO-2017193172-A1 (Year: 2017).*
KR-102092860-B1 (Year: 2020).*
JP-5833267-B1 (Year: 2015).*
JP-2018207669-A (Year: 2018).*
JP-2018207669-A (Year: 2016).*

* cited by examiner

*Primary Examiner* — Manish S Shah
*Assistant Examiner* — Michael J Singletary
(74) *Attorney, Agent, or Firm* — Barnes & Thornburg LLP

(57) ABSTRACT

A software application is provided to easily determine an indication of an amount of light available at a location at a given point in time. The software application may be used indoors or outdoors and is configured to be easy to use and highly accurate.

19 Claims, 7 Drawing Sheets

Observer's World Spherical Coordinate System

Observer's World Cartesian Coordinate System

Device Sensor Coordinate System

Device Image Coordinate System

Device Display Coordinate System

APPARATUS, METHODOLOGIES AND SOFTWARE APPLICATIONS FOR DETERMINING A LEVEL OF DIRECT SUNLIGHT

CROSS REFERENCE AND PRIORITY CLAIM

This patent application claims priority to U.S. Provisional Application Provisional Patent Application Ser. No. 62/733,916, entitled "AN APPARATUS, METHODOLOGIES AND SOFTWARE APPLICATIONS FOR DETERMINING A LEVEL OF DIRECT SUNLIGHT," filed Sep. 20, 2018, the disclosure of which being incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Disclosed embodiments pertain to determination of a level of direct sunlight and/or shade in a particular location. More specifically, disclosed embodiments determine a level of direct sunlight available at a particular time or over a period of time for various applications including, but not limited to, determining a suitable growing location for photosynthesis and estimating solar irradiance and insolation onto user specified surfaces.

BACKGROUND

It is known that plant photosynthesis relies on energy in the visible light spectrum. The excitement of electrons in plants' leaves is activated by energy in the form of visible light from the sun. An amount of direct sunlight needed varies greatly from plant to plant. While many plants require up to six hours of direct sunlight a day during the growing season to thrive, the same light energy may harm a different species of plant, causing its failure. Knowing the difference in sunlight requirements is a basic component to successful gardening.

It is known that direct sunlight carries energy which can impact human structures and which can be converted to other forms of energy such as heat or electricity. Direct sunlight can affect heating and cooling requirements for man-made structures. Additionally, direct sunlight can also be converted to thermal or electrical energy and utilized, stored, or transported to other locations. The solar energy which strikes a point is termed irradiance, and when summed over a surface and period of time is termed insolation.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Disclosed embodiments provide an apparatus, methodologies and software applications that enable the determination of the amount of direct sunlight at a particular location.

Disclosed embodiments determine a level of direct sunlight available at a particular time or over a period of time for various applications including, but not limited to, determining a suitable growing location for photosynthesis, estimating the effect of irradiance on structures, and estimating the potential for converting irradiance to other forms of power.

Disclosed embodiments utilize software that computes all the possible paths of the sun across the sky during the time interval specified by a user. Computed paths are transformed into a representation on a computer device's screen to guide the user to scan the computer device's camera across the possible paths and capture images of sky with any obstructions which might block the sun's light from reaching the computer device's location.

Disclosed embodiments utilize the data captured in this way to map the solar paths onto the captured images and determine whether the target portion of the image corresponds to a path segment of open sky or, on the contrary, something opaque which would block sunlight. This information is aggregated and presented to the user as an average amount of time sunlight that can strike the computer device during the specified date interval, as well as a power factor which is proportional to the amount of insolation the measured direct sunlight can impart.

BRIEF DESCRIPTION OF THE FIGURES

The detailed description particularly refers to the accompanying figures in which.

DETAILED DESCRIPTION

Figure 1:
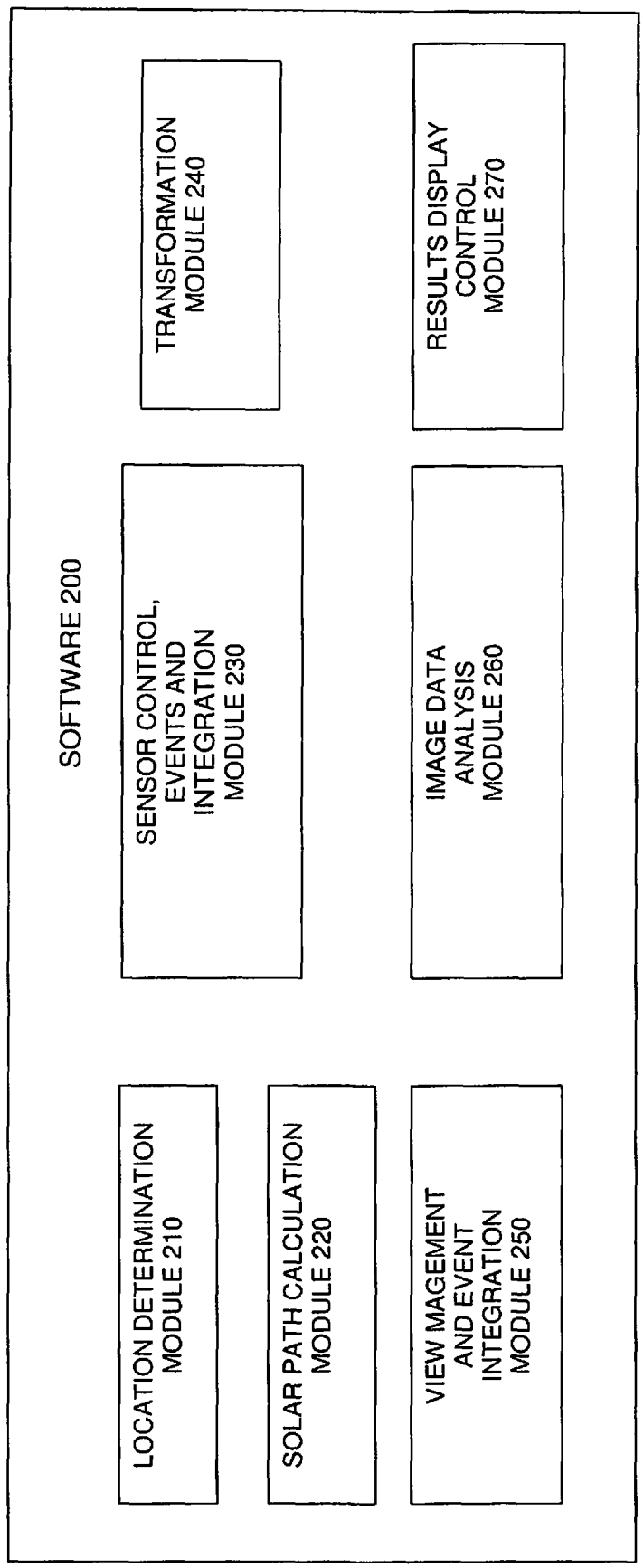
FIG. 1 illustrates one example of software required to run on hardware of a computer device to implement the disclosed apparatus and the associated inventive methodologies.

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Disclosed embodiments provide an apparatus, methodologies and software applications that enable quick, accurate, and easy prediction of the amount of direct sunlight experienced at the apparatus' location, taking into consideration intervening objects such as foliage or buildings which would prevent direct sunlight from striking the location of the apparatus, and factors such as probable atmospheric absorption or diffusion of light, and the angle at which the light would strike a specified surface.

Various types of utility in several application realms may be provided by illustrated embodiments including 1) assisting growers and gardeners select and arrange plants in one or more growing locations according to plants' needs, 2) assisting architects, engineers, designers, and installers to evaluate solar irradiance and insolation on various locations and surfaces.

In the realm of plant husbandry, disclosed embodiments may reduce failed plantings due to improper light for photosynthesis because too much or too little visible light is detrimental to plant growth and health. As a result, illustrated embodiments aid the gardener in selecting, planning, and designing their garden site(s) including one or more growing locations.

As recognized conventionally, plant photosynthesis relies on energy in the visible light spectrum. The excitement of electrons in plants' leaves is activated by energy in the form of visible light from the sun. This electron energy is converted into ATP and powers cellular respiration. Plant cells use pigments, primarily chlorophyll and carotenoids, to detect the presence of light. These plant pigments are active in wavelengths of the visible light range, specifically indigo-blue (400-475 nm) and red (640-680 nm) for chlorophyll. Carotenoids expand the range of blue light absorption with activity between 450 and 500 nm.

Blue light in the range of 430 to 480 nm is absolutely required to stimulate the chemical changes necessary to make chlorophyll. For maximal chlorophyll biosynthesis in angiosperms (flowering plants), it is thought that illumination with blue light is required.

As the amount of direct sunlight needed to power respiration varies greatly from plant to plant, knowing the difference in sunlight requirements is a basic component to successful gardening. Conventionally, gardeners draw a map of their site, watch the sun pass throughout the course of a day, and make a diagram or rough sketch. However, this process is time consuming and inaccurate. Moreover, many variations can add to the complexity of a site and render visual measurements difficult. These variations include but are not limited to: changing seasonal foliage in upper story trees, the changing effect of building shadows, changes in seasonal sunlight, and shadows from nearby plants or shrubs (varying in growth throughout a growing season). Thus, without a tool to denote hours of sunlight received in a location, a gardener is left to make a best guess.

Thus, illustrated embodiments of the invention provide an apparatus and methodologies, which could be used by architects and planners, lawn and garden industry personnel, or the "do-it-yourself" home gardener to determine the amount of light exposure a growing location receives in a day.

"Locations", as that term is used in this description, may refer to a particular area of a lawn, garden, structure, building, room, surface, or other objects and may include exterior and/or interior locations.

As a result of determining the amount of light exposure, determined light exposure levels may be used to determine the types of plants that would do well in a particular growing location.

Thus, in accordance with an illustrated embodiment, a determination of the total amount of sunlight available at a site is possible without the use of calculations, graphs or expensive equipment. Accordingly, an illustrated embodiment removes variable guesswork that results in costly plant failures and lost growing opportunities.

An illustrated embodiment may be used as a diagnostic tool for existing plantings to determine, if a plant is not thriving, if improper light levels are the cause.

In the realm of architecture, engineering, and structural design, disclosed embodiments may permit designers and architects to evaluate solar irradiance on a location, surface, or architectural feature, facilitating optimal orientation of structures. Disclosed embodiments may also compute total insolation permitting more accurate evaluation of insulation, heating, and cooling requirements. Total insolation also facilitates the estimation of potential energy capture capabilities of systems employing photovoltaic conversion, solar heating, solar thermal energy capture, and artificial photosynthesis. In all of these endeavors, it is crucial to determine the amount of direct sunlight impingent on a specific point or surface (solar irradiance). In particular, it may be necessary to account for the angle at which that sunlight strikes the location or surface of interest, as that angle may directly influence the energy transfer efficiency. It is furthermore crucial to sum the irradiance over time (known as insolation) and area to determine the total power created by the direct sunlight over a period of time.

As a result of determining the amount of directed light exposure, incident energy normal to surfaces both natural and man-made may be determined to facilitate absorption and conversion calculations.

As explained above, disclosed embodiments provide an apparatus, methodologies and software applications that enable quick, accurate, and easy prediction of the amount of direct sunlight the device's location could experience, taking into consideration intervening objects such as foliage or buildings which would prevent direct sunlight from striking the location of the apparatus.

Disclosed embodiments may be implemented using software (an example of which being included in the attached Appendix) running on a processor based computer device, for example, a smart phone, tablet, laptop, or other computational device, equipped with conventionally known and commonly available hardware and associated features.

For example, hardware of the computer device required to run the software to implement the disclosed apparatus and methodologies should support certain basic capabilities that are commonly found on smart phones and portable tablets, for example, portability. The computer device needs to be portable, so that it can be easily taken outdoors and pointed at the sky as directed by the augmented reality indications generated by the software.

Likewise, the computer device should be equipped with sensors which provide the software with sufficiently accurate and stable information. For example, such sensors are required to determine the computer device's orientation with respect to the Earth. Notably, the combination of a magnetometer, and accelerometer, with optional assistance of a gyroscope, are available in most conventionally available smart phones.

Further, the computer device should have an imaging system configured and capable to capture accurate color representations of a scene. For greater accuracy, programmatic control of the focus and exposure is useful.

The computer device should have the capability to determine the computer device's location to within a few kilometers. This can be accomplished with either a Global Positioning System (GPS) sensor, or conventionally known cellular tower triangulation capability. Both of these are typically available on conventional smart phones. Alternatively, the software may be configured to enable acceptance of manual input identifying a location from a user via the user interface of the computer device.

The computer device should include a display on which guidance can be displayed to the user for the purpose of capturing images which cover all the possible paths of the sun.

The computer device should include user interface mechanisms by which a user may enter information or trigger events, such as touch sensitive screen, buttons, keyboards, mouse, microphones, etc.

The computer device should contain sufficient storage to save captured images and other intermediate results until analysis stages of processing (explained herein) are complete.

The computer device should have one or more computer processors with processing capability of sufficient speed and power to perform all the necessary computations within an acceptable amount of time. Likewise, the computer device should include an Operating System (OS) to facilitate access to the various hardware and sensors needed by the inventive software, as well as to manage interactions with any other software which might be running on the computer device.

In implementation of a methodology in accordance with the disclosed embodiments, a user of the apparatus implemented by running the software on the computer device may be guided by on-screen augmented-reality indicators to scan a path which the sun would take across the sky during a user-specified range of dates (e.g., a local growing season). During this scan, images may be captured of any objects which would block direct sun light from reaching the apparatus's location. The apparatus's orientation and location may be saved with each capture.

Disclosed embodiments 1) may be embodied in one or more apparatuses implemented by running software on a computer device (herein after termed "apparatus" and meaning any or all of the possible embodiments) and 2) may utilize a methodology implemented in and enabled by the apparatus (herein after termed "methodology", meaning any or all of the possible methodologies described herein). The term "apparatus and methodologies" as used hereinafter are to be understood to include all instances of "apparatus" and "methodology" as defined above. Thus the term "apparatus and methodologies" is not limited to a single disclosure, apparatus, or methodology, but rather is meant to indicate to any and all the disclosures presented herein.

A user of the disclosed apparatus and methodologies may be guided by on-screen augmented-reality indicators to scan a path which the sun would take across the sky during a user-specified range of dates (e.g., a local growing season). During this scan, images may be captured of any objects which would block direct sun light from reaching the apparatus's location. The apparatus's orientation and location may be saved with each capture.

Once captured, the images may be mathematically superimposed on the computed solar path, and the software may calculate an amount of time that the sun's path(s) are not obscured by buildings, foliage, or other opaque objects. This result may be output to the user as an average number of hours of direct sunlight that would impinge on the apparatus's location during the specified interval, absent cloud cover, smoke, or other transient phenomena. Additionally, the software may compute factors representing solar irradiance and insolation of a user defined surface, and may include adjustments to account for atmospheric effects.

In implementation, the inventive software includes a plurality of components operating and cooperating to provide the above described functionality.

Figure 2:
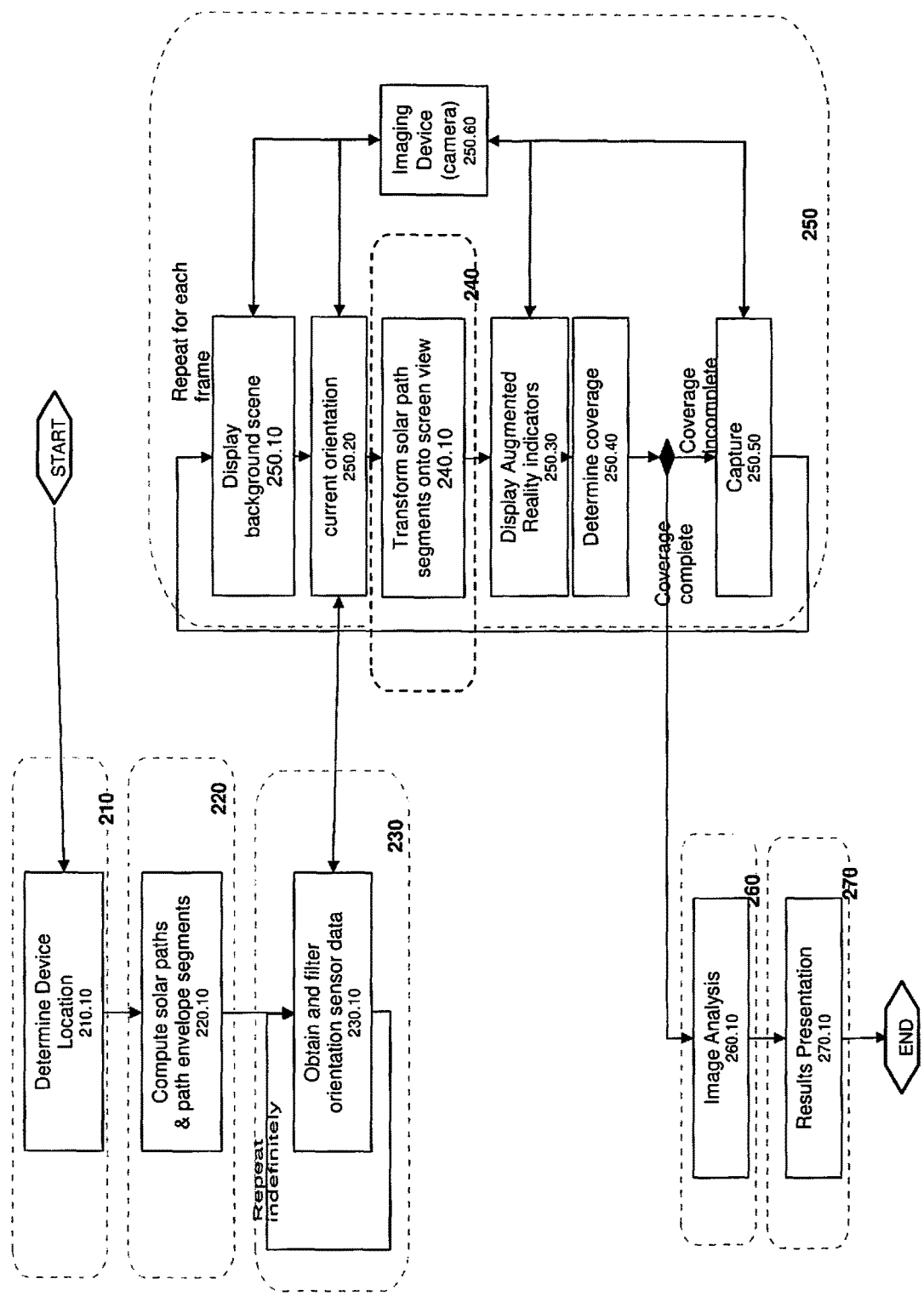
FIG. 2 illustrates on example of operations performed in accordance with the disclosed embodiments to provide the disclosed functionality.

FIG. 1 illustrates one example of software required to run on hardware of a computer device to implement the disclosed apparatus and the associated inventive methodologies. Likewise, FIG. 2 illustrates on example of operations performed in accordance with the disclosed embodiments to provide the disclosed functionality.

As shown in those figures, the Location Determination Module 210 may be configured to determine the current location of the apparatus to within a few kilometers or to within fractions of a meter, depending on the need. For the purpose of computing the path of the sun across the sky, accuracy of a few kilometers is sufficient. For the purposes of averaging impingent direct sunlight over a surface, sub-meter accuracy may be desired.

The Solar Path Calculation Module 220 computes the path of the sun across the sky relative to the location of an observer as determined in 210. This module may be configured to compute the path of the Sun across the sky at any location on the earth on any day of the year. In general, the solar path across the sky can span as much as 360 degrees, e.g. near the North or South poles. It should be understood that capturing such a path in a single exposure would require a wider angle of view than available on most photographic equipment.

Thus, in accordance with at least one embodiment, the sky is "scanned" by the apparatus and methodologies so as to capture multiple overlapping exposures such that the complete sequence of captured images spans all possible paths of the sun during the time interval of interest.

Augmented reality indications may be presented to the user on the apparatus's display. Since the sun has a different path across the sky each day of the year, and since the user is typically interested in the average sunshine at the apparatus's location over a period of weeks or months, the augmented reality indications may be configured to show a collection of solar paths or (more efficiently) a region which encompasses those paths.

As a result of this operation, during the scan phase of the apparatus and methodologies implemented using a computing device and the disclosed software, the solar path envelope may be described by a set of polygons: one representing the entire envelope, and a number of smaller disjoint polygons which exactly cover (or tile) the envelope. Some of the tiling polygons may be marked as "captured".

Thus, each tile (as described above) of a captured image contains one or more solar path fragments. Where the path fragment crosses a pixel, a determination may be made whether the pixel depicts "sky" (e.g. sun, clear sky, clouds) or "other" (e.g. foliage, buildings, etc.). The aggregate totals of "sky" pixels versus. "other" determines the percentage of potential direct sunlight for each tile. Since each tile's width corresponds to a known time interval, the total amount of direct sunlight can be computed. By determining, the interval between sunrise and sunset times, the period can be converted to hours of direct sunlight per day. That value may be averaged over the user specified date interval. It is understood that while some embodiments may find it convenient to define tiles using time and elevation boundaries, other embodiments may choose other measures to form boundaries and that tiles may be any size or shape which is convenient for an embodiment.

The Sensor Control, Events, And Integration Module 230 may include components that establish a stream of events from the hardware sensors to an orientation service which can be queried by other components to determine the current Azimuth and Elevation of the lens axis, and Tilt of the apparatus. This module may also apply filtering techniques to eliminate noise originating in sensor electronics or jitter from a user's unsteady hand. This module obtains sensor data and filters it on a continuous, real-time basis. Other components may interrogate this module at any time to immediately obtain a filtered and current value for the device's orientation.

However, this encompassing region (referred to herein as a "solar path envelope") is too large to be captured in one shot. Thus, the apparatus and methodologies may be configured to enable the user to scan across the region by performing multiple image captures. To help the user efficiently capture the entire encompassing region, the region may be subdivided into smaller segments termed "tiles." These smaller regions "tile" the entire encompassing region; thus, taken together the tiles add up to the entire encompassing region, but do not overlap each other. The tiles may be chosen to be small enough so that many fit into the camera's field of view. As the user performs each capture, the tiles may be marked (e.g. shaded or color changed) on the display of the apparatus and a visible counter may be incremented. When all the tiles are marked and the count of captured tiles equals the total number of tiles required to capture the encompassing region, an output may be displayed to the user to inform that capture is complete. Additionally, the software automatically enters the analysis phase to analyze the captured data.

Alternatively, the scanning process can be optionally automated for the user in at least two ways. First, the apparatus and methodologies can be configured to enable the user to optionally request that the software automatically decide when to perform a capture, obviating the need to touch the screen to trigger a capture. For example, automatic capture could be triggered whenever there are a sufficient number of non-captured tiles (i.e., not shaded) visible on the screen. This may be sufficiently determined if the number of tiles displayed is greater than ½ of the maximum tiles that could be displayed on the screen; or if fewer than the maximum tiles that could be displayed on the screen remain un-captured and at least one un-captured tile is displayed on the screen. Other heuristics are similarly possible.

Secondly, if the computer device implementing the apparatus and methodologies has sufficient processing power, the software may be configured to enable a "scan-bar" approach wherein, a very narrow but tall window in the center of the display is the only region where data is captured similar to a panoramic picture scanning configuration. In this implementation, the user is able to scan this bar across the solar path envelope and the sky/non-sky computations may be performed in real-time or near real-time for all pixels and image elements under the bar. Calculations may be ordered in a vertical direction, so that pixels representing the same time of day from all the paths in the date range are aggregated first.

The Transformation Module 240 may include a suite of components configured to transform solar paths and solar path envelope segments (expressed in terms of e.g. Azimuth, Elevation) into augmented reality indications (expressed in screen coordinates) on the arbitrarily oriented screen of the computer device implementing the apparatus. This may include a suite of components configured to transform various frames of reference from one to another as necessary.

The View Management and Event Integration Module 250 which may be implemented as a software component integrates camera hardware, an augmented reality user interface showing solar paths and indicating which portions of the paths have been captured by the apparatus and methodologies, user interface controls elements to control, trigger and configure the apparatus and methodologies, and storage mechanisms to store captured data and images.

As specifically illustrated in FIG. 2, component 250.60 may be configured to encapsulate and hide differences between camera implementations among various computer devices, provide mechanisms to set focus, exposure, image size, white balance, etc., for each capture, provide mechanisms to set the size and rate of scene preview on the display, provide mechanisms to initiate image capture, provide means for the user to change the apparatus and methodologies' configuration. As mentioned above, image capture may, optionally, be triggered automatically, based on the number of tiles not yet captured within the image. The View Management and Event Integration Module 250 may communicate captured images to the rest of the software for storage and processing. This can be performed asynchronously.

Specifically, the View Management and Event Integration Module 250 may: 1) display the camera preview background scene upon which augmented reality elements may be displayed (250.10); obtain and display current orientation (230.10 & 250.20); display augmented reality solar paths, solar path envelope segments, with optional shadings and colorings, mapped onto screen so as to coincide with their apparent locations on the camera preview (250.30); indicate those path envelope segments which have already been captured, and facilitate determination of when all path envelope segments have been captured (250.40); and perform image and data capture (250.50 & 250.60) at appropriate times, storing all information necessary for subsequent computations on the apparatus's storage.

If a user is operating in a mode of operation that enables them to determine whether a sufficient number of regions are triggered with the computer device, the component 250.4 may be configured to trigger a capture by touching the screen of the computer device anywhere. Alternatively, the component 250.4 can be configured to make this decision automatically.

Each capture operation may be assigned its own serial capture number (i.e., exposure number). Every tiling polygon which entirely within the display region but not yet captured may be marked as captured and annotated with the current capture number. This enables the analysis phase to associate the appropriate orientation and mapping data with each tile polygon's capture.

The Image Analysis Module 260 of the software processes each capture and determines which parts of the solar paths are blocked by opaque objects. This analysis may be aggregated over all solar paths in the specified date interval to obtain a (average) ratio of direct sunlight to blocked sunlight, and the average daily hours of direct sunlight reaching the apparatus.

The Image Analysis Module 260 may also aggregate the total of direct sunlight weighted by various factors, including but not limited to: 1) atmospheric haze, humidity, pollution, cloud coverage typical to the location; 2) elevation, which affects the degree to which the atmosphere absorbs sunlight; 3) the angle of the incident sun beams to the normal vector of a user specified target surface, which affects energy absorption by the surface.

The Results Display Control Module 270 formulates and triggers display of a screen summarizing the results of the analysis performed by the image data analysis module 260.

With this understanding of the software modules used to implement the disclosed embodiments in mind, an explanation is possible over various terms and operation and cooperation of the modules to provide the disclosed functionality.

It should be understood that typically, a user may be interested in direct sun exposure over a period of time greater than a single day. In one example, a user might be interested in knowing average direct sunlight throughout a growing season, or during a crucial maturation period of a specific plant at a particular location. In another example, a user may be interested in the amount of sunlight impingent on a surface or structure for the purpose of evaluating the amount of solar energy directed at the structure or surface, e.g. to determine insulation needs, to determine required heating/cooling capacity, or to determine available solar energy for conversion to heat or electricity, or for other purposes.

Consequently, disclosed embodiments enable the ability to compute the total amount of direct sunlight directed at a location or surface over all times of the day over all the days in a desired time interval.

It should be understood that the position of the sun in the sky and an observer's exposure to its direct rays are a function of date, time, and of the observer's location. For example, on the same day of the year, an observer near the earth's pole may experience a shorter exposure to direct sunlight than an observer near the equator, or vice-versa—an observer near the earth's poles may even experience days of the year when the sun does not set at all, and other days when the sun does not rise at all; such days do not occur at the equator. Furthermore, an observer in a single location may experience less daily direct sunlight during the winter than during the summer. Finally, when the sun is low in the sky (e.g. during the winter season or near the end of the day), the solar energy impingent on the user's location is less than when the sun is high in the sky.

As a result, the observer's location can affect the length of the growing season and the heating/cooling seasons. Thus, a location near New York City will have a very different growing season than one near Salt Lake City or Naples Italy, even though they are nearly on the same latitude. This variation is the result of various climatological and geographical influences. Likewise, they will have different structural insulation, heating, and cooling requirement.

Accordingly, the software implemented on a computer device to provide the apparatus in accordance with the disclosed embodiments is configured to determine its location by means of GPS sensors, Cellular Triangulation, Wi-Fi triangulation, or manual input. Typically these are mediated by the computer device's Operating System (OS).

Likewise, since time and the Sun's azimuth and elevation are tightly coupled, the device should have access to the correct date and time of day. Usually, these are available from the OS, which in turn determines them from GPS signals, cellular signals, Wi-Fi signals, and an internal clock.

Figure 3:
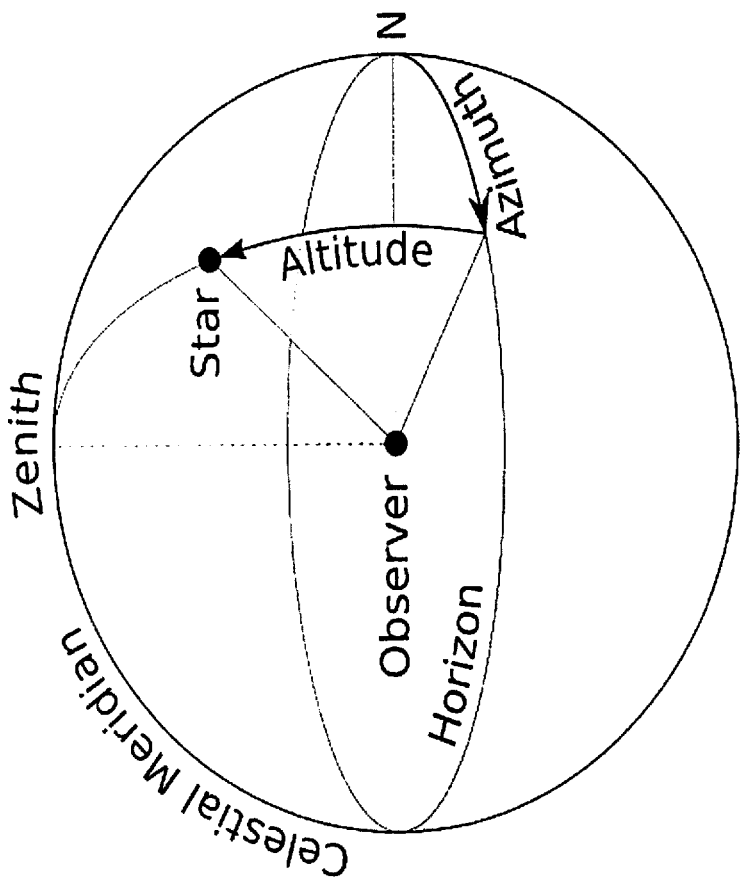
FIG. 3 illustrates a spherical coordinate system which can be used to identify the location of objects, e.g. the sun, in the user's environment.

Once the location is determined to within a few kilometers and time within a few seconds, the apparatus and methodologies implemented using the computer device and disclosed software uses conventionally known algorithms to compute the location of the sun. The computed position of the sun in the sky may be expressed in the Observer's World Spherical Coordinate System, as illustrated in FIG. 3 and defined in subsequent paragraphs, using Azimuth and Elevation angles.

The implementations of the apparatus and methodologies utilize various Frames of Reference and Coordinate Systems to describe locations of points, lines, and surfaces in the real world and in the apparatus. The terms "Frame of Reference" (FoR) and "Coordinate System" are very close in meaning and often are used interchangeably. Both indicate a reference relative to which points, lines, and surfaces are described and measured. However, there is a slight difference in emphasis, the former term (FoR) emphasizing relative orientation of entities, and the latter emphasizing representation of entities.

The following paragraphs describe the FoR/Coordinate Systems used in the methodologies and implementations of the apparatus and methodologies.

Throughout this document, the term "Cartesian Coordinate System" has its conventional meaning, described e.g. in https://en.wikipedia.org/wiki/Cartesiancoordinate_system. Right-handed orthonormal axes are assumed. However, throughout this document the term "Spherical Coordinate System" has a slightly unconventional meaning, in order to better coincide with the usual conventions of compass bearings and the Horizontal Coordinate System (see below). In particular, Azimuth is measured in a clockwise (Easterly) direction from North, and Elevation is measured upward from the horizontal plane.

The "World Geographic Coordinate System" is used to specify an observer's location, which is given by longitude, latitude, and elevation. This is an absolute frame of reference with respect to the world and does not change as the world or the observer move. See, for example, https://gisgeography.com/latitude-longitude-coordinates/ for a detailed description.

The term "Observer's World Spherical Coordinate System" refers to a coordinate system which is used to locate points in space relative to the observer who is fixed to a location specified relative to the World Geographic Coordinate system. This coordinate system uses Azimuth and Elevation angles to describe a line from the origin of the system to the point being located, and a radius to specify the distance from origin to point. The origin of this coordinate system is the observer. This coordinate system, also known as a "Horizontal Coordinate System" is described in https://en.wikipedia.org/wiki/Horizontal_coordinate_system. See FIG. 3. The Observer's World Spherical Coordinate System is bound to the observer (its origin moves with the observer); while its orientation is bound to the earth (Azimuth=0 always points to true North). This coordinate system is the one used by most algorithms to compute the apparent location of the sun in the sky.

Figure 4:
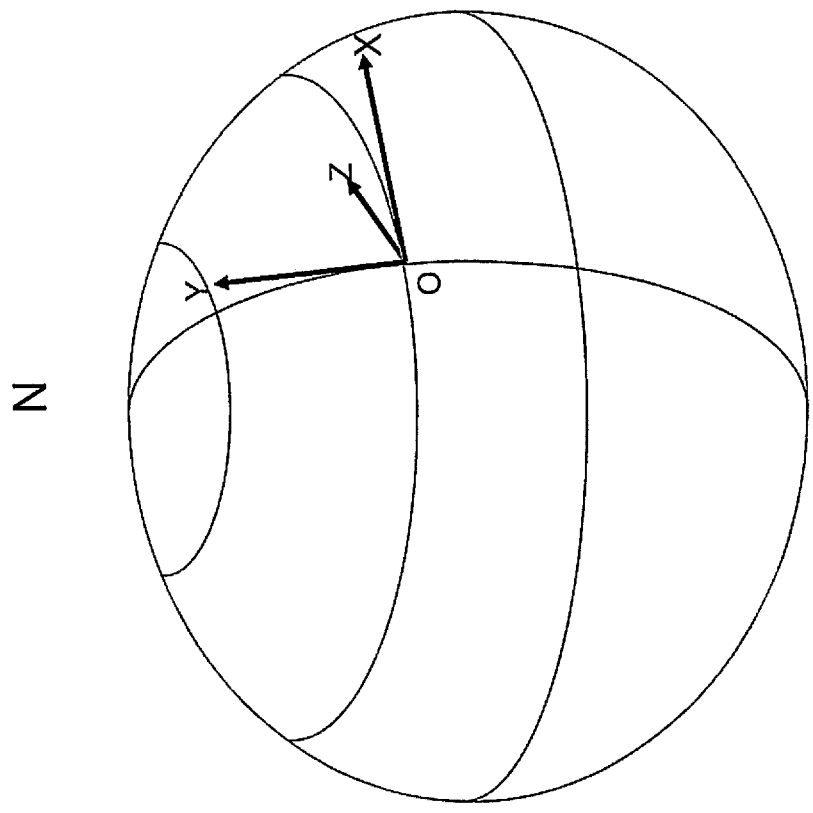
FIG. 4 illustrates a Cartesian coordinate system which can be used to identify the location of objects, e.g. the sun, in the user's environment.

The term "Observer's World Cartesian Coordinate System," as illustrated in FIG. 4, refers to a coordinate system which is a Cartesian version of the World Spherical Coordinate System where the observer is the origin of the system. The X and Y axes both lie on the Observer's horizontal plane (the plane where elevation=0). The Y axis is coincident with the line Azimuth=0. The X axis is perpendicular to the Y axis and is positive in the Eastward direction. The Z axis is positive in the upward direction. The Observer's World Cartesian System is bound to the observer (its origin moves with the observer); however its orientation is bound to the earth.

Figure 5:
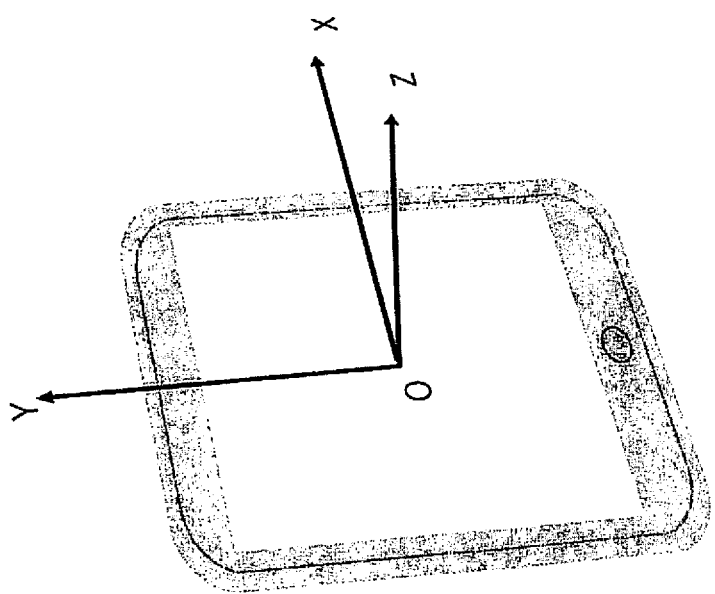
FIG. 5 illustrates an example of a coordinate system used to express sensor data

The "Device Sensor Coordinate System," as illustrated in FIG. 5, refers to a Cartesian Coordinate System which serves as the frame of reference for device orientation sensors. When the computer device implementing the disclosed apparatus and methodologies is in a standard (portrait) upright position with the screen facing the user, the X axis points to the right, the Y axis points to the top of the device, and the Z axis rises straight up out of the screen toward the user (See FIG. 5). Thus, the origin is in the center of the display. This coordinate system is tightly bound to the device and moves together with the device.

Figure 6:
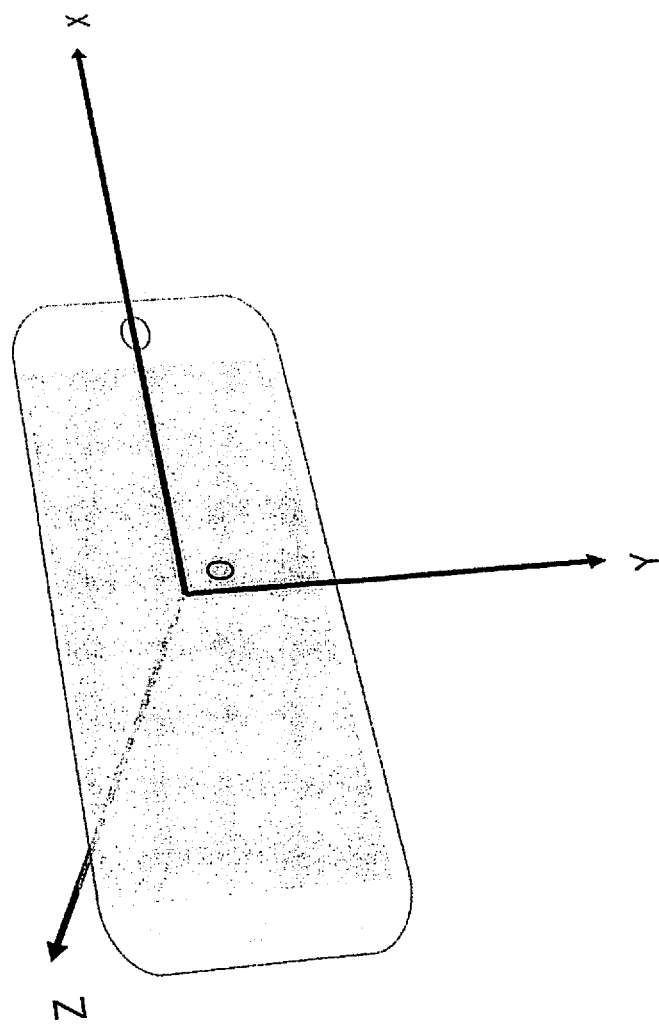
FIG. 6 illustrates an example of a coordinate system which might be used to locate augmented reality indicators on a device screen.

The term "Device Image Coordinate System," as illustrated in FIG. 6, refers to a Cartesian coordinate system which serves as the frame of reference for locating image pixels and whose origin is at the center of the display. When the computer device is in a standard (landscape) horizontal position with the screen facing the user, the X axis points to the right, the Y axis points to the bottom of the device, and the Z axis points away from the viewer, down through the screen, and out the back in the same direction the lens is facing. Note, the Device Image Coordinate System can (and will) be used to represent points which lie outside the apparatus and methodologies; what is important here is the frame of reference that the coordinate system represents. The units of this coordinate system are pixels. The density (pixels per display width) can be fairly low without impacting accuracy of the final result. A typical size is 720×360 pixels for a full image.

Figure 7:
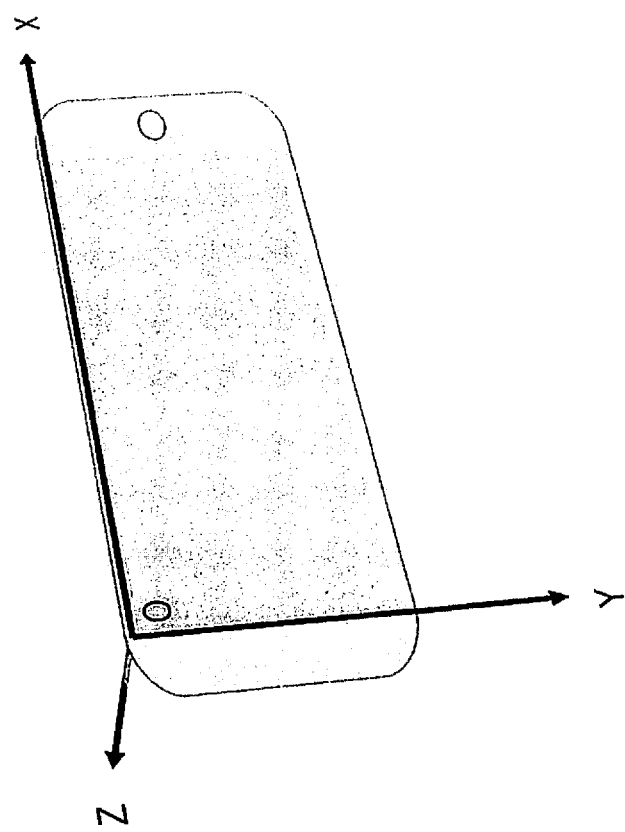
FIG. 7 illustrates an example of a coordinate system which might be used to locate drawable points and objects on a device screen.

The "Device Display Coordinate System," as illustrated in FIG. 7, refers to a Cartesian coordinate system which serves as the frame of reference for locating pixels on the device screen. It is nearly identical to the Camera Image Coordinate System except that the 1) origin may be shifted to the upper left hand corner of the display, and 2) the units of measure are screen pixels. For example, the Device Image Coordinate System may be scaled such that the computer device display shows a 720×360 pixel rectangle, while the Device Display Coordinate System might have a much higher density, perhaps 2880×1440. Such a difference in resolutions may be desirable, since the high display density prevents the user from perceiving pixelation, while the lower image density may be sufficient for accuracy without increasing computational cost when processing the pixels.

In accordance with disclosed embodiments, various transformations may be performed among FoRs. For example, in order to show the location of the sun in the sky on the apparatus and methodologies's screen in its correct visual relation to the camera preview shown on the screen, it is necessary to convert from the sun's Azimuth and Elevation to the (x,y) pixel coordinates in the apparatus' screen, taking into account the apparatus' physical orientation as well as its optical characteristics. Such conversions will include conversion from spherical coordinate systems to Cartesian coordinate systems as well as conversions needed to account for the orientation of the apparatus and its size and pixel resolutions.

Transformations between spherical coordinate systems and Cartesian systems may be accomplished using commonly known trigonometric techniques. Solar "points" computed by the disclosed apparatus, and methodologies's solar path algorithms are typically expressed as only Azimuth angle and Elevation angle, which, technically speaking, simply provide directions which point from the observer to the sun's location in the sky. Therefore, to use these angles as spherical coordinates, it is necessary to provide an associated radius. However, the actual distance to the sun may be so many orders of magnitude of larger than all other dimensions used in the software that rounding errors might distort computational results. Instead, a value of, for example, at least 10000 times the focal length of the computer device lens may be used. This value should be small enough not to cause sever rounding errors yet large enough that resulting geometries closely approximate the real results. It should be understood that the radius chosen implies a "celestial sphere" or a "virtual sky" which may be termed the "Solar Sphere." Points on this sphere serve as a proxies for the actual locations of the sun (another celestial object), with little loss of mathematical precision.

Several kinds of transforms between Cartesian points and/or frames of reference may be employed in the implementation of the apparatus and methodologies. These include (but are not limited to) rotations, translations, scalings and projections. The transforms can be applied so as to move points (or collections of points comprising larger entities) relative to a fixed frame of reference (called an active transformation), or to move a frame of reference itself while the points remain unmoved (called a passive transformation). Sequences of transforms can be applied, one after another, to yield a "compound" transform. At each step, the transform can be specified relative to the most recent state of affairs (termed an "intrinsic" transform), or can be specified relative to a static external frame of reference (termed and "extrinsic" transform). Rotations, translations and scalings are all "affine" transforms, meaning among other things, they are 1-on-1 and reversible. Projections, which are many-to-1, are not affine or reversible.

A variety of mathematical tools are available and may be used in the described embodiments of the apparatus and methodologies to represent points and collections of points, as well as the transforms among them needed to achieve the desired results. One well understood and developed set of mathematical tools for the affine transforms are available following the development in Schneider & Eberly, wherein points and vectors can be expressed as homogeneous coordinates, and transforms can be represented as matrices. Another approach, especially useful for rotational transformations, is the use of Quaternions. Embodiments are free to mix and match approaches to achieve the greatest simplicity and efficiency. For simplicity, where actual examples are presented, this document uses the homogeneous points, vectors, and matrices approach, as they are the most widely understood. This choice of presentation is not meant to exclude the Quaternion or other approaches from inclusion in the presented embodiments.

Arbitrary rotation, translation, scaling, and other operations can be defined as matrix operations. More specifically, a Cartesian/Cartesian transform may be represented as a (4×4) matrix and a point or vector as a 4-tuple. Furthermore, these operations can be composed into complex sequences of operations by matrix multiplication to greatly reduce analytic and computational complexity.

However, the mathematics can be confusing because transforms with very different semantics have very similar appearance. Notably, if a transform is represented by a matrix, it is not immediately clear by inspection of the matrix alone whether is represents and intrinsic, extrinsic, active, passive, simple, or compound transform, since it is merely a 4×4 arrangement of numbers. Consequently, explicit notations and definitions are always needed.

A transform can represent the movement of a set of points from one physical location to another (termed an "Active Transform"), or it can represent moving the coordinate system (or FoR) while the point(s) stay in their original location (termed a "Passive Transform"). It should be understood that active and passive transforms are inverses of each other. Additionally, the inverse of any affine transform may be found by transposing its matrix.

Additionally, it should be noted that every transform matrix can be understood as a change of FoR, wherein the rows and columns are the basis vectors of one FoR expressed in terms of the other FoR.

Further, it should be understood that when considering a sequence of transforms, each step in the sequence could be defined relative to the most recent result, or relative to some external unchanging standard. Accordingly, transformations which are defined relative to an unchanging external Frame of Reference are termed "Extrinsic," while those which are defined relative to a previously transformed Frame of Reference are termed "Intrinsic."

Thus, the results of the following two rotations are quite different. For example, an intrinsic transform may involve rotating a FoR 45 degrees about its X-axis, and then 45 degrees about the resulting Y-axis, whereas an extrinsic transform may involve rotating a FoR 45 degrees about a global X-axis, and then 45 degrees about the global Y-axis.

It should also be understood that transforms may often be implemented using matrices, wherein homogeneous coordinates, vectors and points may be represented as a tuple of 4 values (a, b, c, d), which can be also represented as a 1 dimensional matrix of 4 elements. As a result, a transform may be represented by a 4×4 matrix, wherein the transform may be applied to the vector by multiplying the vector by the matrix to obtain the (transformed) vector.

Accordingly, the transform $v'=T(v)$ may have two commonly used (mathematically equivalent) matrix notations. In the first, we "pre-multiply the vector by the matrix":

$$\begin{bmatrix} n_0 & n_1 & n_2 & n_3 \\ n_4 & n_5 & n_6 & n_7 \\ n_8 & n_9 & n_{10} & n_{11} \\ n_{12} & n_{13} & n_{14} & n_{15} \end{bmatrix} \begin{bmatrix} v_0 \\ v_1 \\ v_2 \\ v_3 \end{bmatrix} = \begin{bmatrix} v'_0 \\ v'_1 \\ v'_2 \\ v'_3 \end{bmatrix} \quad \text{(equation 1)}$$

In the second, we "post-multiply the vector by the matrix":

$$[v_0, v_1, v_2, v_3] \begin{bmatrix} m_0 & m_1 & m_2 & m_3 \\ m_4 & m_5 & m_6 & m_7 \\ m_8 & m_9 & m_{10} & m_{11} \\ m_{12} & m_{13} & m_{14} & m_{15} \end{bmatrix} = [v'_0, v'_1, v'_2, v'_3] \quad \text{(equation 2)}$$

For the numerical results of these two multiplications to be the same (for example, $v'_0 = n_0 v_0 + n_1 v_1 + n_2 v_2 + n_3 v_3 = m_0 v_0 + m_4 v_1 + m_8 v_2 + m_{12} v_3$), i.e. for the two transformed vectors v' to have identical values, the matrix $N_{ij}$ should be the transpose of the matrix $M_{ij}$. Thus expressing the transform T in matrix terms depends on the convention used.

A consequence of this difference may be that complex transforms are composed differently when using matrices. If we wish to apply first Transforms $T_1$ and then $T_2$, algebraically we would write:

$$T_1(v) = v' \quad \text{(equation 3)},$$

$$T_2(v') = v'' \quad \text{(equation 4)};$$

or equivalently:

$$T_2(T_1(v)) = v'' \quad \text{(equation 5)}.$$

Using matrices, this can be expressed differently, depending on the multiplication convention used:

$$v[T_1][T_2] = v'' \quad \text{(equation 6) using post-multiplication}.$$

or $$[T_2][T_1]v = v'' \quad \text{(equation 7) using pre-multiplication convention}.$$

Note, the order of matrix multiplication is important, and that matrix multiplication is NOT commutative.

Unless otherwise noted, the descriptions in this document of the apparatus and methodologies implemented using the computer device running the presently disclosed software use the pre-multiplication convention (equations 1 and 7). An embodiment may implement the software using either multiplication convention, so long as it does so consistently. An embodiment may change back and forth among conventions on occasion, since doing so might afford efficiencies such as avoiding matrix inversions or changing representation to match different hardware.

Additionally, as a practical matter, when deriving transforms for the software, the orientation of the computer device relative for which the coordinate system is be defined must be understood. For example, defining a point in Device Display Coordinate System may be ambiguous without defining the orientation of the computer device.

Additionally, it should be remembered that the perspective projection transform is not affine. It maps points in 3-D space onto a 2-D plane, typically the image plane. It is not affine because it may map multiple distinct points in space to the same point on the plane, and hence is not 1-to-1 and not invertible.

In accordance with disclosed embodiments, and in order to minimize possible ambiguities, transforms defined in this document observe a naming convention designed to help clarify their meaning. It should be remembered that a number of the coordinate systems defined herein are attached in one way or another to the computer device, imaging hardware and display hardware. Thus, as the device changes orientation, the coordinate systems change orientation as well. In addition, it is necessary at times to also switch from one coordinate systems fixed to the device or the world to another. These combined changes of coordinate systems can be modeled by chaining together multiple transforms. This can become confusing. The purpose of the naming convention is to clearly identify the semantics and effect of the named, possibly compound, transform.

The names of the transforms all have the form OC_O'C', where the first pair of letters describes the initial state of things, and the second (primed) pair following the "_" describe the transformed state of things. The first letter of a pair indicates the orientation of the device, while the second letter indicates a coordinate system. Since more than one coordinate system may be in play at any given time, the naming conventions allows one to identify which one is being used when a particular orientation may be specified. In particular:

O, the first letter, may represent the initial orientation of a coordinate system.

C, the second letter, may identify the initial coordinate system in use.

O', the third letter, may represent the final orientation

C', the fourth letter, may identify the final coordinate system.

This notation can represent the combination of modifying a Frame of Reference (FoR) by rotation, translation, etc., and by switching to a different coordinate system. By specifying both the orientation and coordinate system, it may be much easier to decompose a complex transform into a sequence of simple, easily understood steps.

The letters O and O', are placeholders for a letter used to indicate device orientation. The letters which may be used in place of O and/or O' are:

W—Signifying that the device is in World orientation which is defined to be when the Sensor coordinate system aligns with the world coordinate system (Compare FIGS. 4 and 5).

L—Signifying that the device is in default Landscape orientation, i.e. top of device left, screen facing user, world Y-axis co-linear to lens (Z-axis) axis (or equivalently, lens axis azimuth=elevation=tilt=0).

U—Signifying that the device is in some other, User defined orientation, defined by (azimuth, elevation, tilt).

The letters C and C', are placeholders used to indicate the coordinate system in use, and may be replaced by one of the following:

W—Signifying the World Cartesian coordinate system, as defined in "Observer's World Cartesian Coordinate System"

S—Signifying the Sensor coordinate system, as defined in "Device Sensor Coordinate System"

C—Signifying the Camera coordinate system, as defined in "Device Image Coordinate System".

Several transform following the above naming convention are referenced by name in this document. These named transforms are defined as follows:

LC_LS identifies a constant passive rotational transform in which the frame of reference changes from "Device Image Coordinate System" to "Device Sensor Coordinate System", while the device stays in "Landscape Orientation". This transform is equal to UC_US and WC_WS.

LS_LC identifies a constant passive transform which is the inverse of LC_LS;

LC_WC identifies a constant passive transform that rotates the device (e.g. Device Image Coordinate System) from Landscape orientation (lens axis has Azimuth=elevation=tilt=0) to World orientation. Its inverse is WC_LC.

LS_WS, identifies the passive, constant rotation of the sensor frame of reference from its default orientation (the 'W' orientation: Y-axis=North, X-axis=East Z-axis=Up) to its orientation when the camera is in default (landscape "L") orientation (Y-axis=West, X-axis=up, Z-axis=back at user, or equivalently azimuth=elevation=tilt=0). This transform is constant and is equivalent to intrinsically rotating the Sensor FoR 90 about the X-axis axis, then 90 about the resulting Z-axis axis. T=Z-axis(90)*X-axis(90);

By definition, in the camera "initial" orientation, the device is oriented such that the sensor X-axis axis points directly up, the Y-axis sensor axis points to the left (West), and the Z-axis sensor axis points at the user coming out of the screen. This will cause Azimuth=0, Elevation=0, and Tilt=0. All rotations introduced by the user (e.g. while scanning the sky with the apparatus) are measured from this initial orientation. This orientation is also termed "landscape" orientation.

LW_LC identifies the (constant, passive) rotation which remaps a point in the World FoR to the Camera FoR, while the device remains in Landscape orientation.

LC_LW, identifies a transform which is the inverse of LW_LC.

UC_US identifies a constant passive transform converting a point's representation from the Sensor Coordinate system to the Camera Coordinate System, while the device remains in the user selected orientation. UC_US is its own inverse, and is constant regardless of device orientation.

LC_LS identifies a transform identical to UC_US, as it does the same thing as UC_US while the device is in Landscape orientation.

$$LC\_LS = UC\_US \quad \text{(equation 8)}$$

LC_UC identifies a passive transform dependent on the device user's selected orientation, which rotates the camera (and hence all the Frames of Reference attached to the camera) from its default Landscape orientation to the orientation chosen by the user.

LS_LC identifies a constant passive transform converting a point's representation from the Camera Coordinate System to the Sensor Coordinate system. It is equal to UC_US.

US_UC identifies the (constant passive) Rotation which maps a point represented in Sensor FoR to the same point represented in the Camera FoR, while the device remains in the user selected orientation. It is its own inverse. It is equal to LS_LC, since it is independent of the device's orientation. It is unaffected by changes in the device's orientation. It is equivalent to (intrinsically) rotating the Sensor FoR by 180 about the X-axis axis, followed by a 90 rotation about the resulting Z-axis axis. T=Z-axis(90)*X-axis(180). Note that US_UC=UCUS=LC_LS=LS_LC, i.e. US_UC is its own inverse, and is constant regardless of device orientation.

US_WS identifies a passive transforms which maps the representation of a point/vector expressed in the device's sensor coordinate system into a representation of the same vector/point in the world orientation, while the device remains in an unchanging user specified orientation. It is a function of the device orientation.

WC_LC identifies a constant passive rotation which re-maps the coordinates of a fixed point/vector expressed relative to the Camera FoR to account for rotating the device (Camera FoR) from "World orientation" to "Landscape orientation" (see above). Using intrinsic rotations, first rotate −PI/2 about camera Y-axis, then −PI/2 about the new camera Z-axis' axis.==WC_LC. In other words, this rotates the Camera FoR by rotating the device from World to Landscape orientation.

WS_LS identifies a constant passive rotation which re-maps the coordinates of a fixed point/vector expressed in device "Sensor Coordinate System" to account for rotating the device Camera FoR from "World orientation" to "Landscape orientation" (see above). Using intrinsic convention, first rotate PI/2 about sensor X-axis axis, then PI/2 about the new sensor Z-axis' axis. WS_LS is the inverse transform of LS_WS.

WS_WC identifies a constant passive rotation which maps the coordinates of a fixed point/vector from the Sensor Coordinate System to the Camera Coordinate System while the device remains in default World orientation.

In accordance with disclosed embodiments and the above definitions, a sequence of transformations may be performed to provide the functionality disclosed herein. For example, solar path points in World Spherical Coordinates may be computed by computing the sun's position in the sky throughout each day of the chosen date. The values computed are points on the solar sphere and are expressed in the World Spherical Coordinate System. Trigonometric conversion are be used to convert this representation the points into the World Cartesian Coordinate System.

In a typical embodiment, sensor data obtained from the device is expressed the Device Sensor Coordinate System. Typically, the accelerometer outputs a Device Sensor Coordinate System vector pointing up from the center of the earth. Similarly, the Magnetometer outputs a Device Sensor Coordinate System vector pointing toward magnetic North. These may be held in an orientation service which stores a limited history which permits noise filtering. Filtered Device Sensor Coordinate System values can be transformed to World Cartesian Coordinate System and thence to World Spherical Coordinate System to express and display the device's orientation.

When the software functionality requires the computer device's orientation, a filtered version of the orientation information may be provided, for example, what is often termed the "Rotation Matrix" (RM), and which is equal to the transform US_WS described herein.

In accordance with disclosed embodiments, relationships between various transforms are present. In the notation used below, "B*A" means "apply transform A, then apply transform B to the result"; i.e. "B*A" suggests "B(A)." The operator "*" is associative, but not commutative.

Consequently, US_WS can be computed from the following sequence of intrinsic transforms.

$$US\_WS = LS\_WS * LC\_LS * UC\_LC * US\_UC \quad \text{(equation 9)}$$

The inverse of US_WS, i.e. WS_US, may be computed with the following intrinsic sequence of transforms:

$$WS\_US = UC\_US * LC\_UC * LS\_LC * WS\_LS \quad \text{(equation 10)}$$

As a result, one may then solve for LC_UC:

$$LC\_UC = US\_UC * WS\_US * LS\_W * LS\_LC \quad \text{(equation 11)}$$

LC_UC is a passive intrinsic rotation of the Camera FoR from Landscape to User orientation. Thus, $$LC\_UC = \text{rotateAboutZ(tilt)} * \text{rotateAboutX(elev)} * \text{rotateAboutY(azimuth)} \quad \text{(equation 12)}$$

Consequently, the ZXYEulerAngles may be factored out of the LC_UC array representation to obtain (azimuth, elevation, tilt).

Similarly, $$US\_UC * WS\_US = LC\_UC * LS\_LC * WS\_LS \quad \text{(equation 13)}$$

or $$WS\_UC = LC\_UC * LS\_LC * WS\_LS \quad \text{(equation 14)}$$

where WS_UC maps the World=Sensor frame of reference to the user tilted camera frame of reference.

To convert a solar point from World Spherical Coordinates to World Cartesian Coordinates, a point Ps=(azimuth, elevation, radius) on the solar sphere, represented in Solar Spherical Coordinates, can be transformed into a point Pc=(x, y, z) in the World Cartesian Coordinates using the following transforms:

$$x = \text{radius} * \cos(\text{elevation}) * \sin(\text{azimuth}) \quad \text{(equation 15)}$$

$$y = \text{radius} * \cos(\text{elevation}) * \cos(\text{azimuth}) \quad \text{(equation 16)}$$

$$z = \text{radius} * \sin(\text{elevation}) \quad \text{(equation 17)}$$

It should be understood that this is a passive transform. Thus, once this conversion has been performed, the results can be stored for subsequent use, since the points being converted are fixed relative to the world and will not move.

To convert the Observer's World Cartesian Coordinate System representation of a point $P_W$ to its Device Image Coordinate System representation $P_I$ the software may apply the WS_UC $$P_I = WS\_UC * P_W \quad \text{(equation 18)}$$

This single operation may perform multiple frame of reference changes as well as arbitrary device rotations in a single operation.

In a similar fashion, to convert the Device Sensor Coordinate System representation of a point $P_S$ to its Device Image Coordinate System representation $P_I$, the software may apply the US_UC transform:

$$P_I = US\_UC * P_S \quad \text{(equation 19)}$$

Converting from Device Image Coordinate System to Device Display Coordinate System representation may involve two operations. Firstly, a perspective projection may map all points onto the image plane; secondly, an offset may be applied, which may change the origin to be at the upper left hand corner of the device, as required by most display hardware.

The perspective mapping transform may be based on a formula from Schneider & Eberly. It maps points the three dimensional Device Image Coordinate System to the two dimensional Device Display Coordinate System, taking into consideration the rules of perspective, and scaling the resulting image appropriately.

It should be noted that, unless three dimensional points behind the camera are somehow removed, the perspective transform may also map them onto the image, which may produce confusing results for a viewer. Thus, "pruning" may be performed to remove points which should not be mapped to the image or display planes, and offsets maybe applied to change the origin to the top left corner of the screen. At this stage, the points are in a form suitable for passing to the computer device's display API.

As suggested above, most imaging computer devices on which the apparatus and methodologies may be implemented using a computing device and the disclosed software may not support sufficiently wide-angle fields of view. However, since auxiliary lenses of sufficient quality might cost as much as the computer device itself, the apparatus and methodologies implemented using a computing device and the disclosed software can approach the problem of imaging all the potential solar paths within the given date interval by a "scanning" approach. Accordingly, on-screen guidance may be provided to the user to capture successive images of the potential solar paths and interposed objects which might block sunlight.

Thus, for example, supposing the user requests a sun/shade analysis between Date1 and Date2. Accordingly, each day during this interval, the sun rises in the East and sets in the West, thereby travelling an arc across the sky. In general, each arc (corresponding to each day during the time period) is shifted up or down somewhat from the previous one. As a result, one of the arcs is the highest arc, and one is the lowest.

In accordance with various disclosed embodiments, the apparatus and methodologies apparatus implemented using a computing device and the disclosed software may draw the highest and lowest arcs on the screen, connecting them at their ends where they meet the horizon. This enclosed region, and including of the highest arc, the lowest arc, and the straight line segments which join them at the horizon, is termed the "solar path envelope," such that the apparatus and methodologies captures images to cover the entire set of daytime solar paths.

To facilitate this capture, the solar path envelope is subdivided into smaller regions which completely tile the envelope; then, as the apparatus and methodologies captures one or more of these tiles, they are marked (e.g., by shading, color, or outline) so the user can more easily orient the device to include and capture additional tiles which have not yet been captured. As additional guidance, a count may be shown of the regions captured so far, and the total number of regions.

All these on-screen indications should be mapped from solar positions to pixel address in such a way as to correspond with the image preview shown on the screen. In other words, a point in the computed solar path should be mapped to the location on the screen where that point will appear when the camera is in any orientation which would permit the point to be on-screen.

An alternative embodiment could utilize the panoramic capabilities of modern camera hardware and/or applications. In such an implementation, AR indicators may still be required to assure capture of all possible solar paths. For example, a user would be guided to scan the camera axis along the mid line of the solar path envelope in a manner that would include the entire envelope. This could result in a single capture spanning as much as 360° horizontally direction and 45° vertically, and which could include all solar paths of interest to the analysis. Subsequently, display captured/un-captured of the tiles may be performed to guide the user.

Analysis of the captured image could proceed in a similar manner to that described. However, it should be understood that implementation of this approach would require integration of AR indicators to assist in aiming the camera, which may be difficult with a proprietary, third party camera app. Possible solutions to this implementation issue may include building a custom camera app with panoramic capabilities, which could include AR camera aiming guidance. Additionally, implementation using a 3rd party camera application may be difficult to correctly mapping spherical coordinate system points onto the resultant image coordinate system, since a different azimuth, elevation, and tilt could be associated with each x-coordinate of the image as the camera pans across the solar path envelope, but they may not be accessible to the program. Fortunately, most panoramic imaging algorithms rely on matching (i.e., "stitching") successive image segments to each other to create a cylindrical projection of the scene. This matching tends to correct camera tilt and tends to prevent stretching or compression of the projected image, resulting in a predictable relation between (azimuth,elevation) and (x,y) coordinate. Thus, these problems may be managed successfully if the embodiment included logic for building panoramic images.

Yet another embodiment could utilize full spherical 360° imaging apps and/or devices. Using a camera with a hemispherical field of view is possible and programmatically simple, but would involve significant extra costs. Using conventional camera and special apps/software is also possible, and conceptually is similar to the "stitching" process used in panoramic camera apps, except that it scans and stitches both horizontally and vertically. Implementation considerations are similar to the "panoramic" embodiment described above.

In accordance with the disclosed software, a typical embodiment of the apparatus and methodologies performs the operations shown in FIG. 2. Other embodiments and arrangements of these operations are possible, and are not excluded from the invention's scope by the specific arrangements illustrated herein.

These operations may be performed continuously and asynchronously and/or in an ordered operation.

Typically, as shown in FIG. 2, device location is determined in module 210 by accessing underlying GPS, WiFi triangulation, Cell Tower triangulation, or user input facilities. The underlying facilities narrow in on the device's current location. When the accuracy meets a configurable threshold, the software may save the location and proceed with the next steps.

Given the apparatus' location, the sun's path across the sky is computed in module 220 and stored for each day in the user determined date interval.

Module 230 obtains orientation data from the device's sensors on a continuous basis, storing enough information to allow filtering out electronic noise and user manual jitter from the supplied signal. A filtered representation of the device's current orientation (US_WS) can be provided on demand (see component 250.20 of module 250).

Data generated by the orientation service software may be provided automatically or in response to request, to other software modules of the apparatus and methodologies. This data may be provided in the form of a rotation matrix (US_WS) from which lens axis orientation (azimuth, elevation, and tilt angles in the World Spherical Coordinate System) can be computed. Thus, on each pass through the main display loop, the software modules may have access to the most recently determined orientation data so as to properly position augmented reality indicators on screen and save orientation data with each capture.

It should be understood that, in at least some implementations, the computer device's sensors used to deliver a stream of information (e.g., magnetometer, accelerometer, gyroscope, and/or Rotation vectors) to the orientation component 230.10, may be set by software to operate at (programmable) time intervals which are independent of the rest of the software. Thus, as the orientation service software accumulates data, filtering may be applied (e.g., averaging, exponential decay, or Kalman filtering) to reduce noise introduced by the electronics of the sensors or by small hand tremors. Note, it should be understood that there is an assumption that the sensors are reasonably well calibrated. If any obvious signs of mis-calibration are detected, the software may be configured to output a warning of that status to the user via the computer device so as to perform operations to calibrate hardware sensors in the computer device. In any case, inaccurate sensor information will lead to inaccurate results.

Module 250 is responsible for 1) overlaying correctly registered augmented reality indicators over the camera preview display, 2) determining when captures may be performed, 3) determining when sufficient images and data have been captures, and 4) starting the image analysis phase (module 260). Module 250 uses a number of components for this purpose, which are described below.

Concurrently, camera scene previews are output on the computer device's screen by component 250.10.

When needed, component 250.20 of Module 250 obtains the current filtered device orientation from component 230.10. Using this orientation, module 240 transforms all displayable solar path and tile points into the Display Coordinate System.

Given the solar path information (already expressed as polygons in Observer's World Cartesian Coordinate System), equivalent information (also polygons) may be presented on the computer device display as a transform path representation. Thus, the solar path envelope may include a closed polygon formed by connecting all computed points of the highest solar path and the lowest solar path in the specified date interval. This polygon may be divided into smaller regions (also polygons) in order to: 1) fit several of them on the computer device display at once; and 2) facilitate determining when the entire envelope has been captured. Upper and lower boundaries of the sub-regions may be determined by solar paths of dates from within the date interval, while left and right boundaries being multiples of the time increment used to traverse a single day solar path. Points (and hence polygons) may first be mapped into the Device Image Coordinate System using equation 18 above.

The transformed points are used to generate and display the augmented reality indicators on the device screen. These indicators show at least the following: 1) the current orientation of the device as lens axis azimuth and elevation, 2) device tilt with respect to horizontal, 3) the portion of the solar path envelope which currently fits into the camera's field of view, 4) the envelope tiles which currently fit into the camera's field of view, marked to show which have already been captured during a previous iteration of this process, and 5) an indication of how many tiles have still to be captured. The user may be prompted to orient the apparatus' camera so that as many of the envelope tiles not yet captured fit onto the display as may be practical.

With regard to filtering of displayable path regions, however, it should be understood that not all of the points/polygon edges in the Observer's World Cartesian Coordinate System may or should be mapped and drawn, since some points would not map onto the visible portion of the Device Display Coordinate System, and some points may be behind the plane of the Device Display Coordinate System (for example, as discussed above, points behind the plane, if not suppressed, can result in spurious paths being projected onto the visible portion of the plane). Thus, a combination of techniques (referred above as pruning) may be used to eliminate points and lines segments outside the angle of view or behind the plane (termed non-viewable points). These techniques may include application of spherical geometry on the Observer's World Spherical Coordinate System representation to determine which points lie outside the device's angles of view, constructing three dimensional bounding boxes in the Device Image Coordinate System around polygons and testing those boxes for intersection with the three dimensional bounding box constructed from the image frame and radius (in such a technique, polygons which do not intersect this view box would be non-viewable), and constructing a frustrum equivalent to the devices angles of view in the Device Image Coordinate System (in such a technique, points outside the frustrum would be non-viewable; additionally, a point P=(x, y, z) in the Device Image Coordinate System with a negative value of z behind the image plane can be suppressed; moreover, if the inner (dot) product of the lens axis and the vector to a point in Device Image Coordinate System is negative, the point may be non-viewable).

However, it should be understood that each of these pruning methods have various complications. For example, two points may be non-viewable, but a portion of the line between them still may be viewable. As a result, it should be understood that additional case-by-case choices of which methodologies to implement may be necessary.

Drawing facilities provided by the apparatus and methodologies may be able to perform some of the above identified operation while performing clipping using the standard clipping features built into the graphics facilities of portable display devices. However, there may be a trade-off between pruning as many points as possible as early in the process as possible (thereby reducing the cost of transforms) and doing less pruning early but more clipping later.

The last step after all transforms and pruning may be to apply the Perspective Projection to map three dimensional Device Image Coordinate System points onto the 2-D Device Display Coordinate System to enable display to a user.

Remapped points and paths can be output to the device display API and may appear in exact register with objects in the scene at the same elevation and azimuth, thereby forming an enhanced reality display over the viewed scene.

Accordingly, a heavy outline path may illustrate the envelope, with fainter lines showing the sub-regions. Sub-regions that are already captured may be shaded, with those yet to be captured being displayed without shading. Moreover, a count of captured regions vs. total regions may be displayed on the bottom of the screen of computer device's display.

Alternatively, an approach may be implemented which may produce results automatically and nearly in real time. Thus, in such an implementation, while the user is scanning their surroundings, tiles which are fully on-screen (e.g., by comparing the on-screen coordinates of a tile's corners to the corners of the screen) may be selected, which may trigger immediately starting transect processing for those tiles and mark them as "captured" (as described elsewhere in this document). In order to perform this processing, only preview pixels covered by the tile may be required, as opposed to an entire image. Similarly, only solar path information relevant to the selected tile may be required. These computations can be performed in the background on unused cores for greater efficiency. Such an embodiment would not require the user to indicate to the apparatus when a capture should be initiated, and would result in a completely automatic scan, requiring the user only to aim the apparatus.

One of ordinary skill in the art should appreciate that techniques of incremental image acquisition (e.g., such as used in panoramic or 3D image capture) other than tiling as described herein could be used to capture information about the apparatus' surroundings and map this information onto solar paths to produce sunlight/shade information.

Moreover, it should be understood that the disclosed embodiments and the disclosed functionality may be implemented in various other approaches other than the scanning implementation disclosed herein. Therefore, it should be understood that disclosed functionality could be implemented using an application that uses, as input, a panoramic or 3D image having orientation metadata, wherein the mapping of solar paths may be performed onto such image data or the like.

In the presently disclosed implementation, as a user re-orients the computer device, the displayed scene may move across the display, as will the enhanced reality overlay, keeping in register with the displayed scene.

Therefore, as explained above, for the purpose of scene and path capture, analysis of path data superimposed on image data is performed to determine the degree of open sky through which sun can reach the device. This analysis can take a significant amount of time and may not be able to be performed dynamically while the user may be scanning the sky. Consequently, the captured data may be stored for later retrieval.

Subsequently, a capture may be initiated (component 250.50), either by manual user action (e.g. pressing a button on the screen), or algorithmically in an automated or semi-automated manner under control at least partially of the software. If the count of captured tiles does not yet match the total number of tiles in the envelope, the software repeats these operations by returning control to component 250.10. If the captured count matches the total count, the software completes operations of 250 and enter the analysis module 260.

Throughout this document, the term "capture" signifies that the apparatus' camera exposes an image of the sky and any objects blocking sunlight which are within the camera's field of view, and that this image, along with current orientation, solar path and envelope data, tile descriptions and capture status, are all saved to the device's storage for subsequent access by the image analysis component 260.10. Captures may be triggered by explicit user interaction with the apparatus and methodologies, or may be triggered by algorithms implemented in the apparatus and methodologies.

Thus, when a capture is completed, the apparatus and methodologies implemented using a computing device and the disclosed software may write image data, orientation data, and all the solar path and polygon data to the computer device's internal storage, along with the serial capture number. The data may be written in a form that can be readily re-constructed and analyzed. In this way, all information available at capture time may be available at analysis time.

In addition to transforms related to device rotations and changes in Frames of Reference, module 240 may also implement lens correction transforms. Most camera lenses introduce some degree of either barrel or pin-cushion distortion, especially at focal lengths deviating from "standard". It must also be understood that, not all lenses are the same, and so must be characterized and corrected on a model by model basis. While these distortions may not usually be a major issue, a user may wish to achieve greater accuracy by compensating for these distortions. Formulas exist for modeling common lens distortions (see https://en.wikipedia.org/wiki/Distortion_(optics)). Since these distortions a usually symmetric, establishing the degree of distortion in a small number of points and directions may be performed to successfully model the lens. However, if significant distortions are left uncorrected, it is difficult to align virtual objects to the correct location on the display screen.

These distortions are not linear, and so cannot be corrected with affine transforms as described above. Instead, mathematical models of the lens' distortion, look-up tables, or other mechanisms may be used to correct the lens distortion.

As a result, the software implementing the apparatus and methodologies functionality may be configured to guide a user through a series of operations to calibrate a lens. For example, a user may be instructed to stand in front of a more-or-less flat surface with distinct features (e.g., an office building). The camera preview may contain a coarse grid. The user may then be queried to aim the center of the grid on a central feature (preferably small but distinct) and take an image. Subsequently, the user may be asked to shift the camera so that the chosen point may be aligned with the next major intersection of the grid. This process may be repeated until the apparatus and methodologies implemented using a computing device and the disclosed software has enough samples.

Subsequently, because the lens azimuth and elevation are known for each exposure, edge detection and the predicable aim points may be used to identify the selected point in the image, and, therefore, determine the deviation of the point's actual position from its ideal, undistorted position. Thus, by performing this comparison for a number of points and images, the software can be configured to fit the distortion formulas to the obtained data.

Alternatively, lens calibration can be achieved by showing two targets on screen (e.g., one in the center of the screen, one on an edge) and asking the user to aim first at one and then at the other. Comparing the angular rotation of the camera needed to accomplish this provides information which can be used to calibrate the lens. For greater accuracy, this measurement can be repeated several times with differently placed targets.

Module 260 performs an analysis of all the data captured by the preceding modules 210-250. Thus, as alluded to above, in the analysis phase, the apparatus implemented using a computing device and the disclosed software retrieves all the information may be saved during captures, exposure by exposure. For each tile captured during a given exposure, the analysis reconstructs the solar path across the tile for each day included in the tile. For each scene pixel under the solar path, a determination may be made whether or not the pixel is part of open sky. These counts may then be aggregated. Determination of the ratio of sky pixels to non-sky pixels is then indicative of the ratio of sun to shade for that period of time.

An embodiment may also aggregate a product of atmospheric solar attenuation and the dot product of the solar ray and the normal to a surface specified by the user. Atmospheric solar attenuation is a value in the range $0<=$attenuation$<=1$ which represents the likely reduction of solar power due to atmospheric conditions (e.g. haze, probability of cloud cover, elevation, etc.). The dot product will also have a value in the range $0<=$dot product$<=1$, and represents the degree to which solar energy is not imparted to the user specified surface because of solar rays hitting the surface at a glancing angle. The aggregate value so obtained is proportional to the solar energy delivered normal to the specified surface. These aggregated values can be presented separately or in a combined form. The product of these factors and the total direct sunlight time is proportional to the solar power delivered to the user specified surface. Consequently, these factors are termed "power factors".

It should be understood that, for computation of solar paths for each tile, tiles may be constructed so that the width of the tiles represents a known interval of time. Additionally, the tiles may be constructed so that each has a certain known elevation range. Hence, each tile may "cover" or "include" all dates with solar paths that fall into this elevation range. For example, if the tile starts at time $t'$ (and ends at $t''$) and includes a maximum elevation of $E'$ and a minimum elevation of $E''$, then it covers (or includes) all solar paths within the specified date range with elevation E such that E'<=E<=E" at time t'. Note that the days of these paths may not necessarily contiguous.

Accordingly, if two tiles are above each other, it may be required to perform an additional check to ensure that there has not been a double count of the solar path at their mutual boundary.

With regard to superposition of a solar path onto scene image data, it should be understood that, since the earth rotates about its axis at a known rate, time can be expressed as a fraction of that rotation. In particular 360 degrees=24*60*60 seconds. Hence, 1 degree=((24*60*60))/360 seconds=240 seconds=4 minutes.

It should be understood that the sun's height in the sky varies during each day and from day to day. On any given day, it reaches its highest elevation at solar noon; this elevation changes day by day. Hence, there is also a known relation between elevation and day of year. Accordingly, the solar path calculation module may be configured to map between day of year and elevation.

Thus, tiles may be initially defined using the Observer's World Spherical Coordinate System: each may be made to be a constant number of degrees/minutes wide, and either a constant number of days high or a constant angle high. The choice of the constants may be a tradeoff between convenience and computational resources. All tiles are polygons of, for example, 4 sides/points, triangles or other useful shapes. Each capture contains a list of these tile polygons.

Once in the Analysis phase, the captured tile polygons may be transformed to the Observer's World Cartesian Coordinate System. Further, those polygons which are in front of the image plane a further transformed into the Device Image Coordinate System. Those tiles wholly or partially in back of the image plane may be discarded. The size of the tile polygons may be selected such that a tile polygon with a point behind the plane cannot have a point within the computer device camera's angle of view.

As part of analysis, each remaining tile polygon may be considered in turn. A portion of a solar path that crosses/intersects a tile may be termed a "transect." In general, if the user specified a date range, the tile may be intersected by more than one transect. Each transect is associated with a date. The vertical edges of the tile are typically associated with a specific time of day which, in turn, may be associated with an azimuth. Thus, the end-points of the transect (i.e., where the transect crosses the vertical edges of the tile) are at a known elevation and azimuth. These end points may then be transformed into the Device Image Coordinate System, as described above, and mapped onto the image plane using the Perspective mapping projection or transform, and possibly a lens correction transform, as explained above.

The transect may then be approximated by a straight line connecting the two transect end points on the image plane. Since the Device Image Coordinate System's unit of measure is a pixel, rounding the coordinates of any point on a transect to integral values yields the address of the pixel which the transect "crosses".

Consequently, classification of pixels and their neighborhoods may include analysis of a transect by "walking" the transect, pixel by pixel, and determining whether the pixel pictures open sky or something else. Open sky may include clear sky, the sun itself, clouds, or haze. Anything else, i.e., any opaque object(s) such as foliage, trees, buildings, etc., may be considered "something else".

As explained below, pixel classification may consider a pixel's neighborhood. In order, for example, to simulate summer foliage when performing scans during the winter, it may be desirable to "thicken" non-sky regions so that they would have an area approximating what they might have when covered with foliage. The apparatus and methodologies provides a facility for the user to set "thickening" parameters suitable to their site.

Thickening can be simulated by 1) forcing all pixels with a certain distance of a non-sky pixel to be considered non-sky, regardless of their actual values, or 2) when considering a pixel which is sky, check all pixels within the specified distance, and if any is non-sky, categorize the current pixels as non-sky. When classifying a pixel by itself, the most important determinant at the pixel level may be a combination of color and luminance (brightness) represented by the pixel. For example, sky and clouds tend to be bluish in color, and fall into a distinct luminance range. Thus, as alluded to above, the simplest way of deciding if a pixel may be sky or not is simple thresholding, for example:

red+blue+green>620, or red+blue+green >=600 && blue >=red && blue >=green, or blue/red >1.1 && blue/green >1.1 && blue >200, or blue >245

The above example is illustrative, not normative.

Embodiments may employ more accurate techniques, e.g., to train an AI using color and luminance on a set of photographs in which sky has been manually classified.

Finally, considering a pixel's neighborhood enables the software modules to make a more accurate determination. Pixel noise is typically a characteristic of an individual pixel; neighboring pixels do not usually experience the same noise. If a pixel if found not to be consistent with its neighbors, it can be considered "noisy" and either ignored or "fixed" (e.g. by replacing its value with the average of nearby pixels).

High color or luminance gradients surrounding a pixel may suggest that it is not viewing sky, which would have gradients that are generally be rather smooth, even with clouds present. Thus, depending on how large a "neighborhood" surrounding a pixel may be chosen to be, and the abruptness of the gradients present, may indicate, for example, brown/green/black gradients on a blue background can indicate winter (leafless) foliage. Accordingly, the software may optionally be configured to analyze such data to estimate shade/sun during winter. With regard to performance of winter-time estimates in accordance with disclosed embodiments, it should be understood that, during the winter, when foliage has fallen from many plants, and there are fewer obstructions between the computer device and the sun's positions. As a result, a measurement of direct sunlight will yield a higher value than what would be obtained during the growing season when foliage may be present. However, it may be often desirable to plant certain species at this time, as they are dormant. Consequently it may be desirable to estimate the shade/sun in the absence of foliage.

Accordingly, various disclosed embodiments may be configured to perform very simple estimates by "growing" any non-sky borders further into the sky. This may have the effect of merging dense groups of branches into solid blobs, simulating foliage. Such an implementation can be simply simulated by examining not just the pixel coincident with a solar path, but all those nearby as well; if any nearby pixel may be classified as being part of an obstruction, then the coincident pixel would be classified as belonging to an obstruction. The distance to look should be adjustable by the user to accommodate varying kinds of foliage.

Another algorithm may precede this by marking each non-sky pixel (by using special color values, by using the alpha channel, or by a separately maintained data structure) and then marking all nearby sky pixels (i.e. those within a specified distance) as being synthetically non-sky. Any subsequent analysis may consider both kinds of marked pixels as being non-sky.

Alternatively, the software may be configured to perform an estimate by analyzing the captured images in a manner which considers regions of pixels, for example, considering a rectangle within the captured image. If such a rectangle is in an area of the image which contains sky, the color and luminescence of adjacent pixels may not vary very much, as sky may be not a high-contrast scene; more importantly, almost all of the pixels will register as "sky". Similarly, if this rectangle is in an area of the image containing solid foliage buildings, the variation among pixels, while possibly exhibiting contrast, will tend to all be classified as "not-sky". If, however, the rectangle may be over a region which contains bare branches, a traversal of the region will result in pixels being alternately classified as sky and then non-sky. The frequency of this alternation may be a strong suggestion that this region of the image would contain foliage were the image captured during summer. Such regions would be "filled in" to simulate foliage.

The exact parameters (e.g. frequency of change of scene type, frequency of change of contrast, frequency of change of luminescence may be determined experimentally and or using AI techniques.

In accordance with disclosed embodiments, foliage may be simulated, for example, during the winter season when deciduous trees have no leaves by examining each tile, and marking all pixels in the tile as "non-sky" if more than a certain percentage of the tile's image pixels are "non-sky". This particular implementation is simple in implementation and may produce reasonably accurate estimates of summer sun/shade values from bare trees. It should be understood that the size of the tiles can be adjusted to improve accuracy.

In accordance with disclosed embodiments, there may be situations where errors occur in the classification used by apparatus and methodologies implemented using a computing device and the disclosed software, for example, when in the presence of highly reflective surfaces on buildings. Accordingly, the software may optionally include a utility which enables a user to manually inspect the captures and override classification made by the apparatus and methodologies implemented using a computing device and the disclosed software's. Accordingly, an image may be presented to the user and with the ability for the user to select regions of the image and manually classify them as sky/non-sky. Subsequently, data analysis and aggregation may be re-performed without having to obtain new captures.

In accordance with disclosed embodiments, as part of data aggregation, as each pixel in a transect may be encountered, a count may be incremented. Thus, when a pixel is deemed "sky", another count may be incremented. Remembering that each transect represents a known amount of time, the software may be configured to then compute the amount of time that the sun was centered on a "sky" pixel within a transect. That time can be summed over all transects in a solar path to obtain the total direct sunlight during that day, and that sum can be averaged over all solar paths of the date interval to yield an average of sunlight per day.

Additionally, the software can be configured to directly sum the time of direct sun over all sun paths, and divide that by the number of sun paths (=1 day) to obtain the same result.

In accordance with at least some disclosed embodiments, another statistic of value may be the fraction of daytime during which the device may be exposed to direct sunlight. The software can be configured to detect this by tracking the total time that the sun may be above the horizon for each solar path, and dividing the total exposure time by the total above horizon time.

Additionally, some of the disclosed embodiments may also compute a power factor which incorporates atmospheric effects and the angle of incidence of direct sunlight to determine the solar power incident on a surface as described above.

With this understanding of the analytical functionality provided by the software of the apparatus and methodologies in mind, it should be understood that performing the full analysis as described above will take time, possibly a few minutes. During that time, the user may be show an indication of the calculations' progress.

Subsequently, analytical results may be presented when complete on a simple screen of the computer device display showing, for example, the selected date range, the number of days in that range, average number of hours direct sunshine on the device per day, and average percentage of day that the device may be exposed to direct sunlight, and power factors selected by the user.

In accordance with various disclosed embodiments, the software may be configured to enable selection of a choice of date range by a user. By default, the apparatus may be implemented using a computing device and the disclosed software that may compute the approximate beginning and end of the local growing season as the date range over which the average direct daily sunlight will be computed. This may be determined by the software from the latitude and longitude of the device's location, which may be mapped onto climatological data or a local plant hardiness zone, e.g., the USDA Plant Hardiness Zone if within the USA. Other embodiments might select other date ranges as the default, e.g. the coldest or warmest months of the year, etc.

However, optionally, if this default date range selection does not suit the user, the user can specify a date range in an options pull down menu provided on the display of the computing device. Likewise, if desired, the user-specified date range can be saved for use as the default date range for subsequent invocations of the apparatus and methodologies implemented using a computing device and the disclosed software.

In accordance with various disclosed embodiments information from available databases such as NOAA first/last frost date (e.g., to estimate growing season for the user), FDA Plant Hardiness Zones may be integrated together and displayed to a user to assist in selection of suitable plants. Additionally, NOAA precipitation data may be displayed to assist in selection of suitable plants, Solar Radiation Data from NOAA or NREL may be integrated and displayed to enable estimation of irradiance and insolation, etc. Moreover, it should be understood that the desired data can be pre-processed, compressed, and distributed with the apparatus, or this data can be retrieved from available network accessible services as needed.

Accordingly, it should be understood that the software may be configured to provide various displayed outputs on the computer device display. These include, but are not limited to a cross-hair icon (e.g., similar to those used on gun scopes) in the center of the display and indicating the direction of the lens axis. For example, the cross-hairs are decorated with the current azimuth, elevation, and tilt angles. Alternatively, display of a "northern cross" icon may help the user find true North. Likewise, display of arrows indicating which way the user should pan the device in order to find the solar paths. Additionally, as explained above, display of a dark outline along the edges of the solar path envelope and tile outlines may provide additional, readily understood information to a user in a similar manner that controlling the intensity and color of these indicators may as well.

In accordance with at least some embodiments, use of a front facing camera or screen casting can be used to address situations when it may be difficult to place the apparatus in the location whose average sunlight needs to be measured and seen on the display at the same time (e.g., the location may be close to the ground). Note, this implementation, or optional mode, will affect the transformation mathematics described above. Thus, the mode of operation is taken into consideration when performing such transforms.

Alternatively, the user can optionally "cast" the computer device's screen to another computer device, and use the other computer device to guide the orientation of the first. In the case of smart phones capable of casting, the apparatus and methodologies implemented using a computing device and the disclosed software would only have to set up the casting; otherwise the application would be unchanged.

In accordance with disclosed embodiments, as part of generating a shade map, sun/shade analysis may be performed over an entire geographical region. For example, the software may be configured to support setting up a rectangular grid, e.g. with markers, which spans the region to be analyzed, and perform a sun/shade analysis at each point of the grid. Specifications for the grid may be entered manually, or stereoscopic images of the grid could be captured. Upon performing a scan at each point, the software can store the results; and, when done, generate a shade map by interpolating the results of the analyses to infer values for points between the marked locations.

By using stereoscopic site imaging, taking multiple images of the scene surrounding the region enables their analysis and generation or reconstruction of a three dimensional model of the scene. The perimeter of the region can be marked with objects the apparatus and methodologies implemented using a computing device and the disclosed software will readily detect (e.g., brightly colored tennis balls). The locations of the points may be specified either manually or by stereoscopic images as above. A conventional scan may then perform at each marked point. Accordingly, it should be understood that the radius of the solar paths must be set to a large enough value that the rays would appear to be parallel, and would have to indicate to the software the bounds of the region to be mapped.

In accordance with one implementation, the process may involve querying a user to delineate the region to be mapped. Assuming that the shape of the region is a polygon, at each vertex of the polygon the user may be instructed to place a marker which can be easily recognized in images. For example, if any edge is longer than a specified distance, the user should add a vertex on the edge at that distance from the previous vertex.

The user would then be instructed to measure the position of all polygon vertices and enter that data into the apparatus and methodologies implemented using a computing device and the disclosed software. Thereafter, the user may be instructed to stand directly over each vertex's marker, at a chosen distance above the marker, to facilitate and perform capture of one or more images such that all other markers are captured. Subsequently the user would be instructed to enter into the apparatus the chosen distance (e.g., the height of the user's eye level). It should be understood that if the apparatus has sufficiently accurate GPS or intertial location capabilities, much of the user input can be automated.

Accordingly, at each vertex, the user would perform the capture, as described above, with the apparatus held at the same level as specified in the previous operation. As a result, as explained above, construction of a three dimensional model from the captures of the objects which obstruct the sun could be performed.

Subsequently, the region could be divided into a grid of squares of user specified size. These squares would represent the "resolution" of the shade map. More squares would result in a more accurate map, but would take longer to compute. For each square, the apparatus and methodologies implemented using a computing device and the disclosed software would compute a shade analysis similar to the one described above with minor differences. For example, instead of using a captured image of the solar light obstructions, the process may use a "virtual" image constructed by performing a perspective projection of three dimensional points of the model onto the image plane.

Note, in this optional implementation, it may be not necessary to map the entire three dimensional model onto the image plane, but only those points which are visible from the apparatus's vantage point, i.e., other points of the model to not obscure them are on the line from a potential solar position to the apparatus. This implies that the above described operations for superposition of the solar path onto a scene image would compute an image pixel value from the three dimensional model and the lens axis, rather than looking it up in the actual image.

Subsequently, the software could be configured to generate a diagram of the region wherein each grid square would be shaded such that the shading suggests the degree of shade or direct sun, and (optionally) each square could be annotated with a numeric description of the shade/sunlight. The diagram could then be stored in a file in memory and which can be easily displayed on the screen and/or printed.

Various aspects of technical utility may be provided in accordance with the disclosed embodiments, practiced by itself or in combination with access to additional information. For example, the data generated by the disclosed embodiments may integrated with plant databases and seed, soil and other product vendors to enable informed selection of suitable plants. More specifically, many gardeners may find value by providing a tie-in from the apparatus and methodologies implemented using a computing device and the disclosed software to plant databases, helping them select plants suitable to their plant hardiness zone and sunlight availability. Such a tie in could be made by a simple link to a vendor's website, or could be made by incorporating a built in database of such plants. Additionally, apparatus may notify users of plant availability in vendor stocks. Additionally, apparatus may offer images of suitable plants.

Moreover, optionally, atmospheric adjustment may be performed by the software to query public databases to inform the user of factors which may affect the amount of light needed by plants. For example, average humidity, haze, pollution, elevation, etc., can affect the average clarity of the atmosphere at a specific location, probability of density of cloud cover, effect of sun's elevation on solar intensity, as well as other data provided by user-supplied three dimensional models.

In accordance with at least one embodiment, the software may be configured to enable a user to determine the shade cast by an object not yet present in a location being surveyed. Thus, optionally, the software can be configured to accept entry or specification of three dimensional definition data for objects with specified opacity. In such an implementation, these objects may be treated as present with computed sun/shade result as if the object were present.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, additional utility of the disclosed embodiments may be found beyond their use in gardening or agriculture wherein they would facilitate the selection of plants/crops given a desired location by determination of the total sun/shade at that location, facilitation of the selection of a location given the sun/shade requiremen,s of a desired plant/crop and/or associating plant materials by the computer software, for example, using output of QR codes for various products to user's to improve growing success. Thus, although it should be understood that the disclosed embodiments may be used to facilitate the lay-out of entire gardens by generating sun/shade maps, the disclosed embodiment also enable technical functionality the area of architecture. For example, the apparatus and methodologies may be used to assist in determining positioning of structures, determination of how much direct sunlight reaches building interiors through windows and openings, facilitation of HVAC computations and choice of interior materials, determination of shade/sun effects on proposed architectural objects based on three dimensional model data of such objects, or analysis of interior design so as to predict where sunlight falls. Thus, knowledge of where direct sunlight falls through windows and openings may be used to determine choice of colors, materials, finishes, placement of furniture and art work, etc.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of various different entities or individuals.

It should be understood that various connections are set forth between elements in the following description; however, these connections in general, and, unless otherwise specified, may be either direct or indirect, either permanent or transitory, and either dedicated or shared, and that this specification is not intended to be limiting in this respect.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

It should be understood that components disclosed herein may be used in conjunction with, as described above, other components, for example a computer processor.

It should be understood that the operations explained herein may be implemented in conjunction with, or under the control of, one or more general purpose computers running software algorithms to provide the presently disclosed functionality and turning those computers into specific purpose computers.

Moreover, those skilled in the art will recognize, upon consideration of the above teachings, that the above exemplary embodiments may be based upon use of one or more programmed processors programmed with a suitable computer program. However, the disclosed embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Moreover, it should be understood that control and cooperation of the above-described components may be provided using software instructions that may be stored in a tangible, non-transitory storage device such as a non-transitory computer readable storage device storing instructions which, when executed on one or more programmed processors, carry out the above-described method operations and resulting functionality. In this case, the term non-transitory is intended to preclude transmitted signals and propagating waves, but not storage devices that are erasable or dependent upon power sources to retain information.

Those skilled in the art will appreciate, upon consideration of the above teachings, that the program operations and processes and associated data used to implement certain of the embodiments described above can be implemented using disc storage as well as other forms of storage devices including, but not limited to non-transitory storage media (where non-transitory is intended only to preclude propagating signals and not signals which are transitory in that they are erased by removal of power or explicit acts of erasure) such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments. Such alternative storage devices should be considered equivalents.

While certain illustrative embodiments have been described, it is evident that many alternatives, modifications, permutations and variations will become apparent to those skilled in the art in light of the foregoing description. Accordingly, the various embodiments of, as set forth above, are intended to be illustrative, not limiting. Various changes may be made without departing from the spirit and scope of the invention.

For example, at least some disclosed embodiments rely on the user scanning all possible solar paths with camera, capturing surroundings photographically, and constructing an internal representation of the surroundings, which covers all possible solar paths. Other disclosed embodiments may use panoramic stitching techniques to construct a similar covering representation. Other disclosed embodiments may use 360° 3D hardware or applications to construct a similar covering representation. An internal representation might be, for example, a collection of full images, a collection of image fragments, of a mapping of image data onto virtual spherical surface, etc.

Similarly, at least some disclosed embodiments may display at least one augmented reality indicator on the apparatus' screen to guide a user aiming the apparatus to capture solar paths. In such an implementation, augmented reality indicators may be used to show a user all possible solar positions/paths on-screen so that they know where to point the apparatus. For example, the paths may be shown in their correct position on-screen relative to other surrounding objects visible on-screen. As a result, the user can initiate image data capture by pressing the screen or a button. Use of augmented reality indicators on the apparatus's screen may be used to assure the entirety of possible solar paths are captured. On-screen augmented reality display may show a user if any portions of the solar path have been missed.

Disclosed embodiments may automatically initiate a capture when enough un-captured content shows on the screen. Disclosed embodiments may perform on-the-fly automatic capture and computation of the image data. In such an implementation, the image data may be calculated and computed in near real time without building a full representation of an entire image. This can be done by passing the pixels and solar paths associated with a tile to a background process to aggregate total sunshine or shade on a tile-by-tile basis. This may be implemented using other incremental image acquisition techniques, e.g. on-the-fly panoramic image acquisition.

Disclosed embodiments may map all points of daytime solar paths during a specified date range onto corresponding points in an internal representation of a surrounding scene and to determine whether corresponding points are transparent to the sun or opaque. More specifically, scene representation points may be classified as transparent (sky) or opaque (non-sky) by thresholding of their absolute luminance and color channel values, i.e., the brightness and color of a point. Exposure values used in the capture must either be controlled or values must be shifted after the exposure in order to determine absolute luminance. Additionally, color and luminance gradients can be used to aid classification, as sky and clouds generally have low contrast. In implementation, Artificial Intelligence (AI) may be use.

Disclosed embodiments may determine an amount of time solar paths are transparent or opaque throughout each day within a date range and compute averages based on those amounts. Once scene points corresponding to solar paths are classified and counted, the counts can be aggregated, keeping in mind the amount of time a given set of path points spans, so as to produce total direct sunlight time and shade time on a daily basis, and as well as averages for the entire date range. Solar path points can be weighed by the cosine of the resulting ray's angle of incidence while aggregating in order to obtain a power factor.

Disclosed embodiments may simulate foliage to permit scans during a winter season. In particular, this may be performed by growing (i.e., thickening) image regions determined to be opaque (when an opaque pixel is found, all pixels within distance N may also be marked as shade), and subdividing the image into small sections and considering the entire section to be shade if any pixel within it is shade.

Disclosed embodiments may include a front-facing camera to scan image data from difficult locations. This is because it can be difficult to view a screen while scanning some locations, e.g., those close to the ground. Therefore, using the front-facing camera (e.g., selfie mode) can improve ease. Disclosed embodiments may use screen casting to scan image data from difficult locations. This is because it can be difficult to view a screen while scanning some locations, e.g., in small spaces or located higher above ground. Thus, casting the display to a second device might make this easier.

In accordance with disclosed embodiments, it should be understood that lenses may be calibrated to improve accuracy of the solar path to image mapping. This may involve removing pin-cushion or barrel distortion introduced by many lenses. The degree of a given lens' distortion can be measured by taking a few images guided by special augmented reality indicators to capture angular displacement of the lens axis and the corresponding pixel displacement in the mage. One could then fit standard distortion formulae to the obtained data in order to build a model of the lens' distortion. This model could be used to transform image pixels.

In accordance with disclosed embodiments climatic and atmospheric data may be integrated. This may involve, for example, obtaining local first/last frost date to provide a default date interval as a good approximation of local growing season, obtaining local FDA Plant Hardiness zone, obtaining expected local precipitation, and obtaining expected local solar absorption due to cloud cover, haze, altitude, etc. This information may be used to select suitable plants.

Disclosed embodiments can be used to compute solar power available to a specified surface, e.g., to estimate available electricity generating capabilities or insulation needs.

Disclosed embodiments can be used to facilitate a user's search of plant databases to identify, view, locate and purchase suitable plants.

As a result, it will be apparent for those skilled in the art that the illustrative embodiments described are only examples and that various modifications can be made within the scope of the invention as defined in the appended claims.

REFERENCES

Geometric Tools for Computer Graphics Philip J. Schneider, Daved H. Eberley, Morgan Kaufmann, ©2003 Elsevier Science https://www.esrl.noaa.gov/gmd/grad/solcalc/calcdetails.html
https://www.google.com/url?sa=t&rct=j&cr&esrc=s&source=web&cd=4&ved=2ahUKEwjYxL-xo7vdAhWtVN8KHScWCXoQFjADegQIHxAC&url=http%3A%2F%2Fedukacja.3bird.pl%2Fdownload%2Ffizyka%2Fastronomia-jean-meeus-astronomical-algorithms.pdf&usg=AOvVaw38aCOTlCu3elH-ZoyWmpcO

What is claimed:

1. An apparatus for guiding user collection of data and determining a predicted amount of daily direct sunlight at a location of the apparatus over a specified period of time which encompasses a plurality of days, the apparatus comprising:
   a handheld computer device including a camera for collecting image data; and
   software running on the computer device,
   wherein the software controls operation of components of the handheld computer device to provide means for guiding the user collection of image data using the camera to determine the amount of daily direct sunlight at the location of the apparatus over the specified period of time by:

computing a plurality of possible paths of the sun across the sky during the specified period of time, mathematically transforming the plurality of possible paths into a representation for output on a display of the handheld computer device to guide scanning by the user using the camera of the computer device across the plurality of possible paths, outputting the representation to guide the user collection of data, wherein the output representation is output on the display to guide the user scanning and includes a representation of an encompassing region that encompasses the computed plurality of possible paths, wherein the representation of the encompassing region is subdivided into a plurality of segments that collectively total the entire encompassing region but do not overlap each other, wherein each segment is small enough so that a plurality of segments fit into a field of view of the camera, capturing, via scanning, of images of sky and any obstructions which block sun light from reaching the handheld computer device's location during the period of time, whereby the capturing of images of the sky captures image data that covers all possible paths of the sun during the period of time, wherein the displayed segments in the output representation used to guide the user collection of data and capture of images of sky and obstructions are altered iteratively in response to the user performing each capture so that the output representation indicates a degree that the image capture is complete until all of the computed plurality of possible paths of the sun during the specified period of time have been captured, and determining the predicted amount of daily direct sunlight at a location of the apparatus over the specified period of time based on the captured image data, and outputting the determined predicted amount of daily direct sunlight at the location of the apparatus as an average number of hours of direct sunlight that would impinge on the apparatus's location during the specified interval, absent cloud cover, smoke, or other transient phenomena.

2. The apparatus of claim 1, wherein the software includes instructions to determine the predicted average amount of daily direct sunlight at the apparatus location over a specified date range that defines the specified period of time by scanning apparatus' surroundings, to map solar paths during the date range onto the scan, to determine which portions of the surroundings would block the sun and to compute total amounts of daily direct sunlight that would be able to reach the apparatus and the average amount based on the computed total amounts.

3. The apparatus of claim 1, wherein the software includes instructions to capture and construct an internal representation of apparatus' surroundings by scanning the surroundings with the camera.

4. The apparatus of claim 1, wherein the software includes instructions to display at least one augmented reality indicator on the apparatus' screen to guide the user holding the computer device and aiming the apparatus to capture solar paths by at least one of assisting the user in aiming the camera at the solar paths, and ensuring that all of the plurality of possible solar path points have been captured.

5. The apparatus of claim 1, wherein the software includes instructions to perform automated capture of discrete image representations.

6. The apparatus of claim 1, wherein the software includes instructions to perform on-the-fly automatic capture and computation of the image data.

7. The apparatus of claim 1, wherein the software includes instructions to map all points of daytime solar paths during a specified date range that defines the specified period of time onto corresponding points in an internal representation of a surrounding scene and to determine whether corresponding points are transparent to the sunlight or opaque.

8. The apparatus of claim 1, wherein the software includes instructions to determine an amount of time light from points on the plurality of solar paths are blocked by parts of the surroundings or transparent to the sunlight throughout each day within a date range that defines the specified period of time and compute averages based on those amounts.

9. The apparatus of claim 1, wherein the software includes instructions to simulate foliage to permit scans during a winter season.

10. The apparatus of claim 1, wherein the software includes instructions to use screen casting to scan image data.

11. A method for guiding user collection of data and determining a predicted amount of available light at a particular location over a specified period of time which encompasses a plurality of days using a handheld computer device that guides the user collection of data for determination of the amount of daily direct sunlight, the method comprising:

a handheld computer device including a camera collecting image data under control of a user; and guiding the user collection of image data using the camera software running on the computer device to determine the amount of daily direct sunlight at the location of the apparatus over the specified period of time by:

computing a plurality of possible paths of the sun across the sky during the specified period of time, mathematically transforming the plurality of possible paths into a representation for output on a display of the handheld computer device to guide scanning by the user using the camera of the computer device across the plurality of possible paths, outputting the representation to guide the user collection of data, wherein the output representation is output on the display to guide the user scanning and includes a representation of an encompassing region that encompasses the computed plurality of possible paths, wherein the representation of the encompassing region is subdivided into a plurality of segments that collectively total the entire encompassing region but do not overlap each other, wherein each segment is small enough so that a plurality of segments fit into a field of view of the camera, capturing, via scanning, of images of sky and any obstructions which block sun light from reaching the handheld computer device's location during the period of time, whereby the capturing of images of the sky captures image data that covers all possible paths of the sun during the period of time, wherein the displayed segments in the output representation used to guide the user collection of data and capture of images of sky and obstructions are altered iteratively in response to the user performing each capture so that the output representation indicates a degree that the image capture is complete until all of the computed plurality of possible paths of the sun during the specified period of time have been captured, and determining the predicted amount of daily direct sunlight at a location of the apparatus over the specified period of time based on the captured image data, and outputting the determined predicted amount of daily direct sunlight at the location of the apparatus as an average number of hours of direct sunlight that would impinge on the apparatus's location during the specified interval, absent cloud cover, smoke, or other transient phenomena.

12. The method of claim 11, further comprising determining the predicted average amount of daily direct sunlight at the apparatus location over a specified date range that defines the specified period of time by scanning apparatus' surroundings, mapping solar paths during the date range onto the scan, and determining which portions of the surroundings would block the sunlight and computing total amounts of daily direct sunlight that would be able to reach the apparatus and the predicted average amount based on the computed total amounts.

13. The method of claim 11, further comprising capturing and constructing an internal representation of apparatus' surroundings based on the scanning the surroundings with the camera.

14. The method of claim 11, wherein the representation output to guide the user includes at least one augmented reality indicator on a screen to guide the user holding the computer device and aiming the apparatus to capture solar paths by at least one of assisting the user in aiming the camera at the solar paths, and ensuring that all of the plurality of possible solar path points have been captured.

15. The method of claim 11, further comprising performing automated capture of discrete image representations.

16. The method of claim 11, further comprising performing on-the-fly automatic capture and computation of the image data.

17. The method of claim 11, further comprising mapping all points of daytime solar paths during a specified date range that defines the specified period of time onto corresponding points in an internal representation of a surrounding scene and to determine whether corresponding points are transparent to the sunlight or opaque.

18. The method of claim 11, further comprising determining an amount of time lights from points on the solar paths are blocked by parts of the surroundings or transparent to the sunlight throughout each day within a date range and compute averages based on those amounts.

19. The method of claim 11, further comprising simulating foliage to permit scans during a winter season.

* * * * *